United States Patent [19]

Garwin et al.

[11] Patent Number: 4,558,313
[45] Date of Patent: Dec. 10, 1985

[54] INDICATOR TO DATA PROCESSING INTERFACE

[75] Inventors: Richard L. Garwin, Scarsdale; James L. Levine, Yorktown Heights, both of N.Y.

[73] Assignee: International Business Machines Corporation, Armonk, N.Y.

[21] Appl. No.: 667,509

[22] Filed: Nov. 1, 1984

Related U.S. Application Data

[63] Continuation of Ser. No. 336,461, Dec. 31, 1981, abandoned.

[51] Int. Cl.⁴ .................................................. G09G 1/00
[52] U.S. Cl. ...................................... 340/709; 178/18; 340/365 P; 350/6.5
[58] Field of Search ............... 340/709, 365 P, 365 R, 340/365 VL; 178/18-20; 350/99-102, 6.5, 6.8, 6.9, 6.91, 299

[56] References Cited

U.S. PATENT DOCUMENTS

| | | | |
|---|---|---|---|
| 3,184,847 | 5/1965 | Rosen | 33/1 |
| 3,457,646 | 7/1969 | Schwemin | 33/1 |
| 3,543,240 | 11/1970 | Miller et al. | 340/172.5 |
| 3,553,680 | 1/1971 | Cooreman | 178/18 |
| 3,609,237 | 9/1971 | Gerber | 178/18 |
| 3,613,066 | 10/1971 | Cooreman | 178/18 |
| 3,709,602 | 1/1973 | Satomi | 350/6.91 |
| 3,733,979 | 5/1973 | England | 350/6.91 |
| 3,752,558 | 8/1973 | Lloyd | 350/6.5 |
| 3,775,560 | 11/1973 | Ebeling et al. | 178/18 |
| 3,783,445 | 1/1974 | Penwarden | 340/24 |
| 3,818,133 | 6/1974 | Cotter | 178/18 |
| 3,873,770 | 3/1975 | Ioannou | 178/18 |
| 3,898,445 | 8/1975 | MacLeod et al. | 235/154 |
| 3,944,740 | 3/1976 | Murase et al. | 178/18 |
| 4,078,151 | 3/1978 | McNeary | 178/18 |
| 4,104,617 | 8/1978 | Bean et al. | 340/147 |
| 4,181,952 | 1/1980 | Casey et al. | 364/515 |
| 4,198,623 | 4/1980 | Misek et al. | 340/365 P |
| 4,205,304 | 5/1980 | Moore | 340/365 P |
| 4,206,314 | 6/1980 | Prugh et al. | 178/19 |
| 4,213,005 | 7/1980 | Cameron | 178/18 |
| 4,227,044 | 10/1980 | Fencl | 178/19 |
| 4,237,617 | 12/1980 | Goussios | 33/427 |
| 4,277,783 | 7/1981 | Sampieri et al. | 340/708 |
| 4,380,076 | 4/1983 | Bethune | 350/299 |
| 4,386,346 | 5/1983 | Levine | 340/723 |

FOREIGN PATENT DOCUMENTS

| | | |
|---|---|---|
| 52-67219 | 6/1977 | Japan . |
| 55-43679 | 3/1980 | Japan . |
| 1575420 | 9/1980 | United Kingdom . |

OTHER PUBLICATIONS

IBM Technical Disclosure Bulletin, vol. 14, No. 10, Mar. 1972, pp. 3031-3032.
NASA Technical Note SP 5937, Sep. 1971.

*Primary Examiner*—Marshall M. Curtis
*Attorney, Agent, or Firm*—Alvin J. Riddles

[57] ABSTRACT

An interface and terminal are provided between data processing operations and the movement of an indicator member of stylus. The interface and terminal identifies the coordinates of the position of the stylus by the angles that a light beam reflected from the stylus makes with a reference and uses a history of coordinate data for specific coordinate selection. The stylus position is sensed by interruption of light. The terminal retains and displays a trace of the stylus movement. The interface and terminal are useful both for manual to computer input, and, for remote data processing to mechanical movement, such as in displays and manufacturing operations. Accuracy of the order of 0.01 inches in 12 inches is achieved.

14 Claims, 28 Drawing Figures

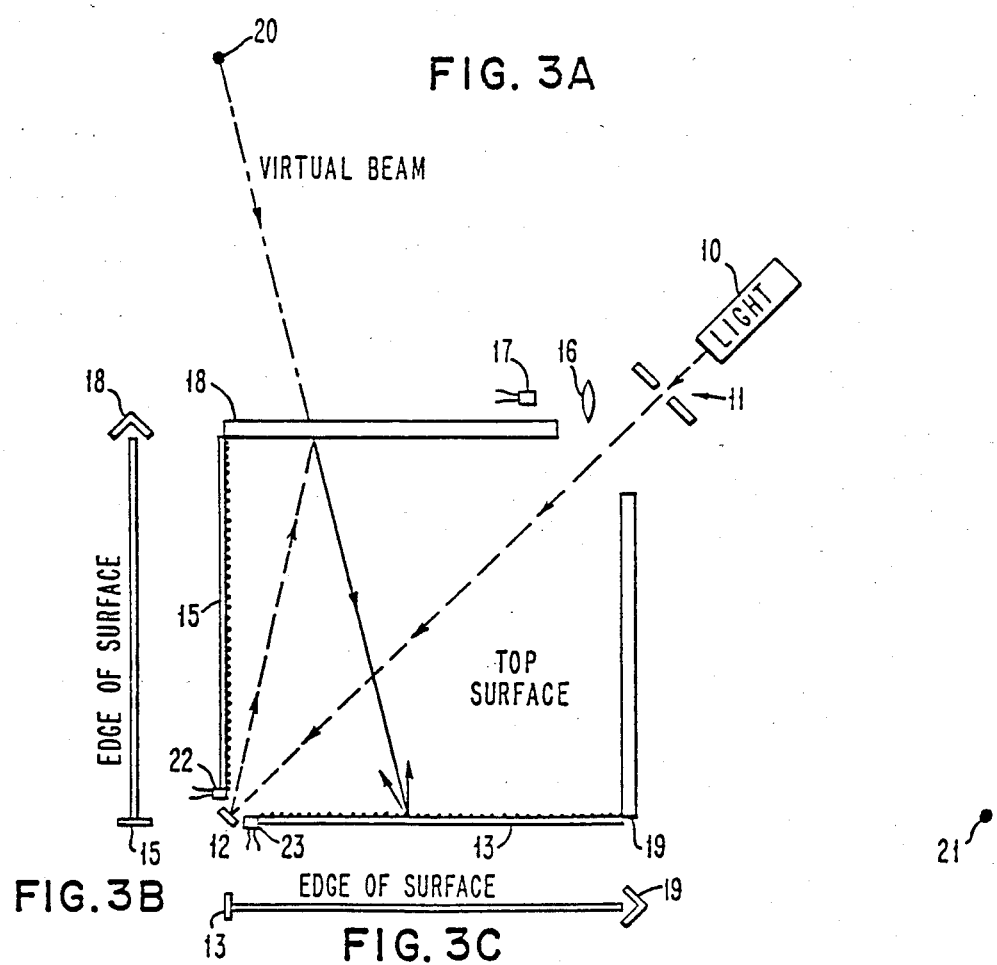

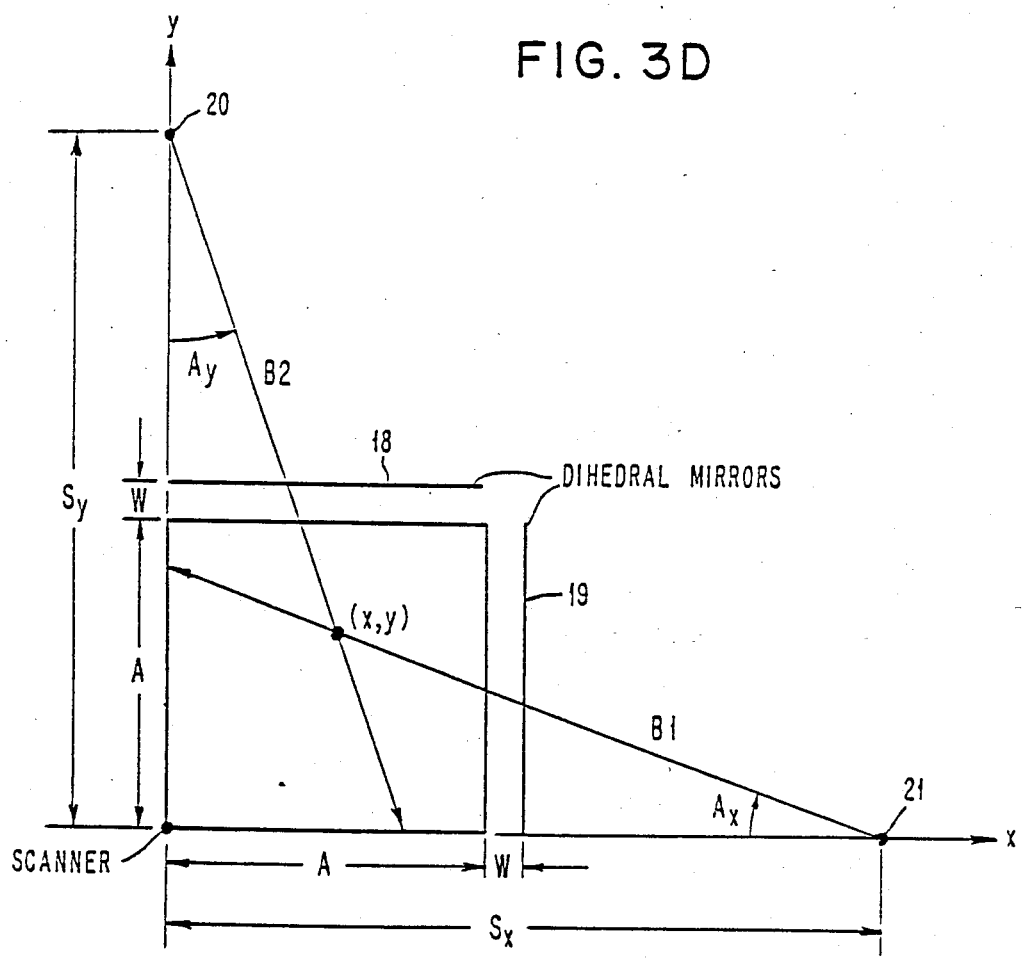

ANALOG SIGNAL

TIME

ANALOG SIGNAL

TIME

DIGITAL SIGNAL

TIME

INDICATOR TO DATA PROCESSING INTERFACE

This is a continuation of applicant's Ser. No. 336,461, filed on Dec. 31, 1981, now abandoned.

DESCRIPTION

Technical Field

The technical field of the invention is that of interfacing the movement of an indicator member or stylus for manual input to data processing operations.

An interface of this type translates the location of a manually moved indicator or stylus into specific coordinates in an operating surface area. The operating surface area may be the two-dimension face plate of a cathode ray tube or other type display.

Manually moved indicator to data processing interfaces have received some attention in the art in introducing manual movements into a data processing operation and systems have been built using many physical phenomena for stylus detection. Among the more popular phenomena are acoustic, optical, force-sensing, capacitive and electrostatic. Each specific technology based on a particular phenomenon provides a different mixture of accuracy, human-factor considerations and cost to performance considerations.

Background Art

The tracking of the location of a manually moved stylus by the use of a technology that is based on optical phenomena has many advantages and is receiving considerable attention in the art.

The most promising technology from the standpoint of simplicity and precision involves the reflection of light from a moving beam scanner in a plane above an operating surface over which the manually positioned indicator or stylus is moved.

The present state of systems involving optical technology requires a moving member that provides an active role in the optics and thereby introduces a limitation on the moving members. The following are two specific examples.

U.S. Pat. No. 3,898,445 describes the establishing of coordinates of a special stylus that emits a signal when a sweeping beam strikes it.

A 1971 National Aeronautics and Space Agency Technical Note describes the use of two beams located at separate points on a single line and employs reflection from a special stylus, that has a cylindrical mirror so that the retroreflected beam is confined within the scan beam and thereby permitting the shaft angle of the scan beam mounting to be usable in determining the position of the indicator member.

DESCRIPTION OF THE DRAWINGS

FIGS. 3A, 3B and 3C are a top and two side views of one optical system of the invention.

FIG. 3D is a geometrical layout to illustrate establishing x-y coordinates for an indicator in the system of FIGS. 3A, 3B and 3C.

DISCLOSURE OF INVENTION

The invention employs angular information acquired through the interruption of a photodetected current produced by a scanning light beam to determine position coordinates of a manually moved indicator or stylus and employs the history of position data to select precise position coordinates. The indicator member or stylus composition is free of reflectivity limitations, the properties of different portions of the indicator may be sensed for information transfer purposes and it may even be the operator's finger.

For simplicity of explanation, the term stylus will be used for the indicator member.

Figure 1:
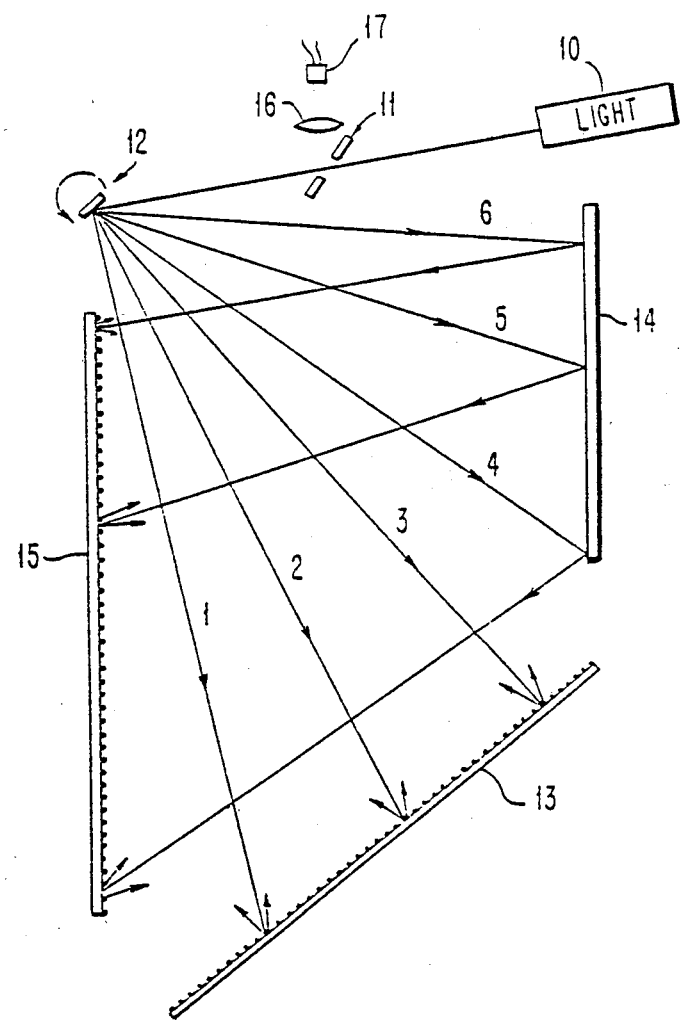
FIG. 1 is a simplified view of the optical system of the invention.

Referring to FIG. 1 a plane view of the relative positioning of the elements in the optical system of the invention is provided for simplicity.

A light source 10 provides a beam which enters the system through a small hole in stationary mirror 11. The beam should be of small diameter and relatively collimated. A laser will serve as a light beam source very satisfactorily. The beam is then swept across a reference surface in the plane of the figure by a rotating or vibrating mirror scanner 12. For a portion of the rotation, the beam crosses the reference surface as illustrated by rays 1,2,3, to strike a retroreflective strip 13. An acceptable strip 13 could be made of beaded material similar to that used on highway signs or high-gain projection screens, preferably having a more directional character. Such a material reflects back toward the source a large fraction of the incident light, the amount being relatively insensitive to the angle of incidence.

The reflected light is confined to a cone having a width of a few degrees centered on the reversed direction of the incoming beams 1,2,3 as shown by the reflected multiple arrows. This light is reflected again by mirror 12 and stationary mirror 11 into collecting lens 16 which provides a focus at photodetector 17.

Under the light of continuous scanning, there will be a steady photocurrent while the beam traverses the strip 13. As the scan continues, the beam strikes stationary mirror 14 and is deflected across the reference surface from a new direction to strike retroreflective strip 15 as indicated by rays 4,5,6. The retroreflected light is again directed to photodetector 17 through mirrors 14, 12 and 11.

It has been discovered that by providing a light that is interrupted by the stylus, many limitations on stylus materials are removed and the properties of the stylus itself become available for information purposes. Even the finger of the user is satisfactory.

In accordance with the invention, a scanning light beam provides a steady photocurrent. A stylus located anywhere in the area of the reference surface will intercept the beam for some range of scanning angles, producing a dip in the photocurrent. The scanning angle at which the stylus is located is established by locating the center of the dip relative to some suitable correlation capability such as a timing mark.

Figure 2:
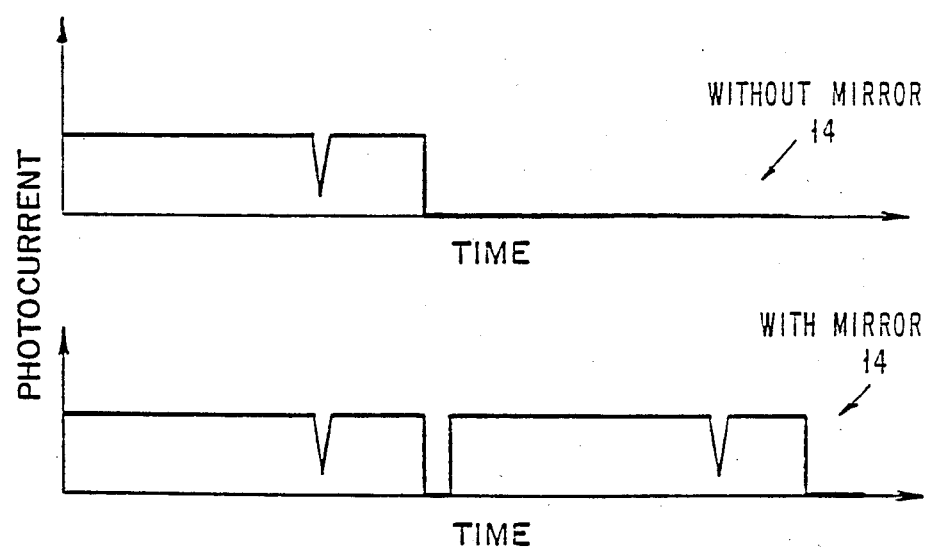
FIG. 2 is a graph of photodetector current with time.

Referring to FIG. 2, a graph is provided illustrating the photocurrent both with and without mirror 14. In FIG. 2, when mirror 14 is provided, the photocurrent is extended and will have a second dip when the beam is again interrupted by the stylus.

In accordance with the invention, determination of the two angles of the scanning beam where the dips appear will then permit the location of the stylus, such as by the identification of x-y position coordinates of the stylus to be established by simple triangulation.

Having established the location of the stylus, in accordance with the invention, as the stylus is manually moved, certain psychomotor limitations are encountered and a decision on which coordinates represent the most accurate data for the application involved is needed for accuracy. It has been discovered that a decision on the specific position coordinates when made employing the history of recent stylus position data provides improved accuracy.

The combination of being able to track and to specify precisely the location of an indicator member on an operating area provides the principles of a manual indicator to data processing input interface that permits a variety of applications, such as highly accurate input devices, displays, terminals and teleconferencing input stations.

In accordance with the invention, the optical system of FIG. 1 is brought into a closer relationship to the boundaries of a working area by optically folding the beams under a reference surface in the operating area. This is accomplished with 90 degree dihedral mirrors positioned along two orthogonal edges of the reference surface. A dihedral mirror is an L-shaped elongated reflecting member generally made up of two mirror strips intersecting on a line or spine at about a 90 degree angle.

A suitable optical system may be seen in connection with FIGS. 3A, 3B and 3C wherein FIG. 3A is a top view and FIGS. 3B and 3C are orthogonal side views. In FIGS. 3A, 3B and 3C, the dihedral mirrors 18 and 19 have their spines aligned with the reference surface and serve to transfer a beam from below to above the reference surface, while acting in other respects as plane mirrors. The beam that passes beneath the reference surface is shown as a dotted line whereas where the beam passes above the surface a solid line is used.

The beam from source 10 through mirror 11 enters diagonally beneath the surface, strikes the scanner 12 which is a rotating or vibrating mirror, and is deflected, still beneath the surface, to dihedral mirror 18. At mirror 18 the beam is reflected from the lower facet to the upper facet as illustrated in FIG. 3B, and thereby transfers the beam to the top where it passes parallel to the reference surface. The beam is now shown as a line over the top of the reference surface where it strikes the retroreflector 13. The retroreflection is indicated by the multiple arrows providing a high steady light for the photodetector 17.

This arrangement optically causes the single beam from source 10 to behave as if it originated from two "virtual scanners" located at imaginary locations 20 and 21. As the scan angle becomes larger, as the mirror 12 moves further around, the beam proceeds to strike dihedral mirror 19, is transferred to above the reference surface and moves along retroreflector 15. Thus, the beam behaves in these scanning angles as if originating at virtual scanner location 21.

Timing to correlate scan with angular information of a line through the stylus and a line from the virtual scanners to the axis of the mirror 12 is provided as the beam strikes phototransistors 22 and 23.

For some scan angles, the beam, after reflecting from one dihedral mirror, will strike the other dihedral mirror rather than a retroreflective strip directly. This results in the beam being brought beneath the surface again. By extending the retroreflective strips so that they are both above and below the reference surface as shown in FIGS. 3B and 3C, the beam can strike the retroreflective strips 13 and 15 at points beneath those illustrated.

It should be noted that some care is required in arranging the mirrors and retroreflectors to ensure that the photocurrent is not interrupted during the transfer from above to below the reference surface.

With the system of FIGS. 3A, 3B and 3C, almost the entire area of the surface is usable.

Where the system is to be used in front of a cathode ray tube or other display, the reference surface can be made of transparent material. It should be noted, however, that since beams pass beneath the reference surface, some physical medium such as glass is preferred to serve as a stop to prevent the stylus from inadvertently being placed in a position that will block the lower beams.

The angular information is acquired as follows.

In accordance with the invention, the folded optical system of FIGS. 3A, 3B and 3C operates to permit the beam to be considered as two virtual scanner beams originating at points 20 and 21.

Considering that the angular information desired is to be translated into x-y coordinates of the operating area, the geometrical triangulation to establish those x-y coordinates of the stylus in the operating area may be developed as shown in FIG. 3D. The stylus is assumed to be located at the intersection of two beams labelled in FIG. 3D as $B_1$ and $B_2$. The coordinate axes are labelled x and y and the origin point is located at the point labelled scanner which is the intersection of the incoming beam and the scanning mirror facet.

The triangulation is as follows.

Let $A_x$ be the angle between $B_1$ and the x axis and let $A_y$ be the angle between $B_2$ and the y axis. Let $S_x$ be the distance between the origin and the virtual scanner 21 located along the x axis, while $S_y$ is the distance to the scanner 20 located along the y axis. The x and y coordinates in accordance with the invention are then expressed in terms of $S_x$, $S_y$ and the two angles $A_x$ and $A_y$ in accordance with equations 1 and 2.

$$X = \tan(A_y)\left[\frac{S_y - S_x \tan(A_x)}{1 - \tan(A_x)\tan(A_y)}\right] \quad \text{Equation 1}$$

-continued $$Y = \tan(A_x)\left[\frac{S_x - S_y \tan(A_y)}{1 - \tan(A_x)\tan(A_y)}\right] \quad \text{Equation 2}$$

Normally, $S_x$ will be chosen equal to $S_y$.

The angles $A_x$ and $A_y$ may in turn be expressed in terms of the scanner angle which will be referred to as $A_s$. Assuming the scanner is rotating counterclockwise, and the beam is leaving the scanner along the x axis when $A_s=0$. In accordance with the laws of reflection, the angles $A_x$ and $A_y$ are related to $A_s$ as set forth in equations 3 and 4.

$$A_x = 4A_s \quad \text{Equation 3}$$

$$A_y = \pi/2 - 4A_s \quad \text{Equation 4}$$

It will be clear to one skilled in the art that the triangulation procedure will fail if $B_1$ and $B_2$ were to approach being parallel. This could occur at the corner of a sufficiently large area diagonally opposite from the scanner, corresponding to $A_x = A_y = \pi/4$. Near this singular point, small measuring or computing errors become magnified so that the usable area will have to be somewhat smaller than the actual available size.

As an illustration, assume that the working surface is a square of side A as shown in FIG. 3D. This leaves an unusable border of width $W=(S/2)-A$, where we assume $S_x=S_y=S$. Let the error in measuring angles $A_x$ and $A_y$ be of order $\delta A$, and let the resulting positional errors be $\delta Q$. Near the corner of the square, the errors would be expressed as shown in equation 5.

$$\delta Q \simeq (S/2)(S/2W)\delta A \quad \text{Equation 5}$$

In order to assist one skilled in the art to practice the invention and achieve high resolution accuracy, the following description will be developed around some particular illustrative dimensions.

Assuming $S/2=14.0$ inches and $A=12.0$ inches. This leaves a border $W=2.0$ inches. Then the position errors will be about $100\delta A$ (inches), with $\delta A$ in radians.

The optical system is subject to the following requirements. The light source must be small and collimated. The laser fills these requirements very well.

In the forward direction, a small diameter beam must scan across the tablet at a nearly constant height. The required precision for the 12 inch area example is of the order of 1 minute of arc.

In the reverse direction, the system must collect as much of the retroreflected light as possible and deliver it to the photodetector, hence the numerical lens aperture for the lens 16 should be kept large. Aiming accuracy of the lens is of reduced importance as the return light is not well collimated.

The height of the various components should be minimized in order that the apparatus be convenient to use. This may produce some conflict with the large lens aperture but an acceptable compromise is possible.

Where the light source is a laser, the following example specifications should be of assistance. A 0.5 mw He-Ne laser provides more than enough power for the 12×12 inch working area and is completely eye-safe. It is equipped with a beam-expanding lens and a focusing lens chosen so as to minimize the beam diameter over the surface. A diode laser is more compact and less expensive, and would probably be used in a production device.

Figure 4:
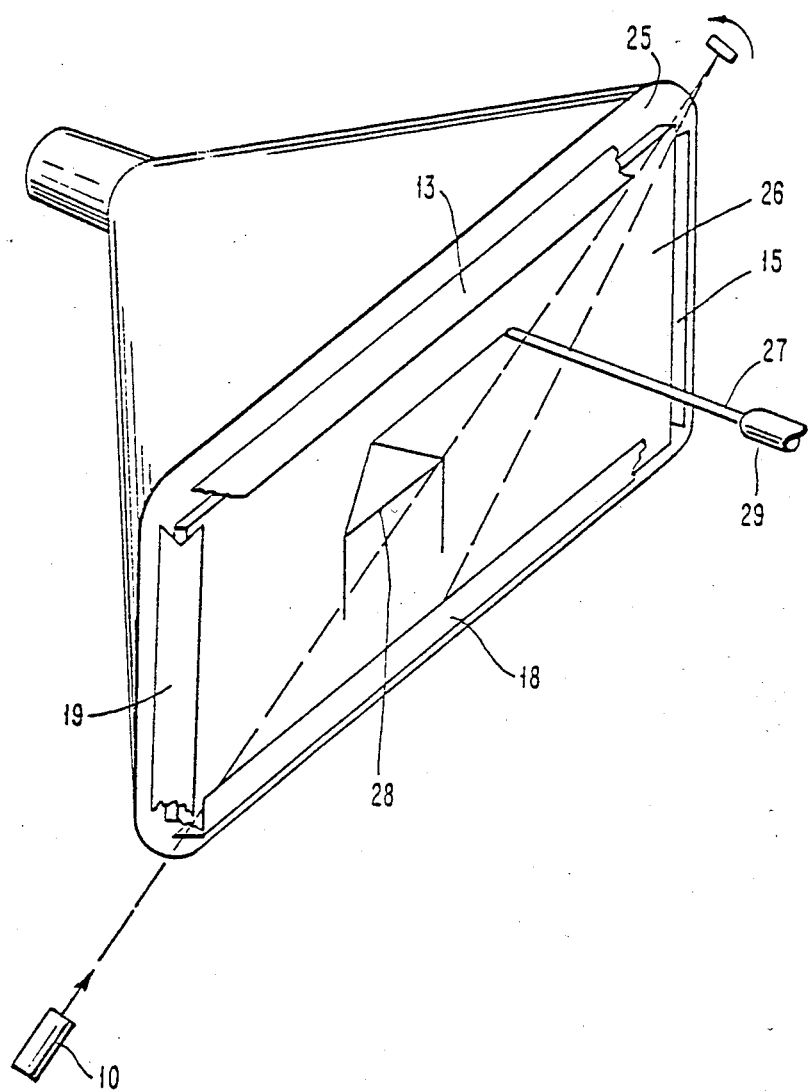
FIG. 4 is an illustration of a display with movement retention.

Referring to FIG. 4, an illustration is provided of the optical system of FIGS. 3A, 3B and 3C mounted in connection with a display to provide indicator movement retention. This permits a display of the pattern that has been traced. The display may be mounted essentially coincident with the plane of the scanner so as to provide a terminal or it may be in connection with a remote location for teleconferencing purposes.

The display member shown for illustration is a cathode ray tube 25 having positioned between the operator and the face thereof, the structure of FIGS. 3A, 3B and 3C. The surface 26 is a reference surface of an operating area. It is positioned so that light from a source can pass beneath the surface 26 to be reflected by the scanner 12. The light beam is then brought to the front of the surface 25 by dihedral mirrors 18 and 19. The scanning beams strike retroreflectors 13, 15 except where interrupted by stylus 27. The system employs standard techniques in the art such that lines formed by a series of x-y coordinates of the stylus tip drawn by the pencil example stylus 27 are retained as the picture 28 is traced and erasure is accomplished by having the system recognize the different refractive equalities of the eraser end 29 of the stylus.

Figure 5A:
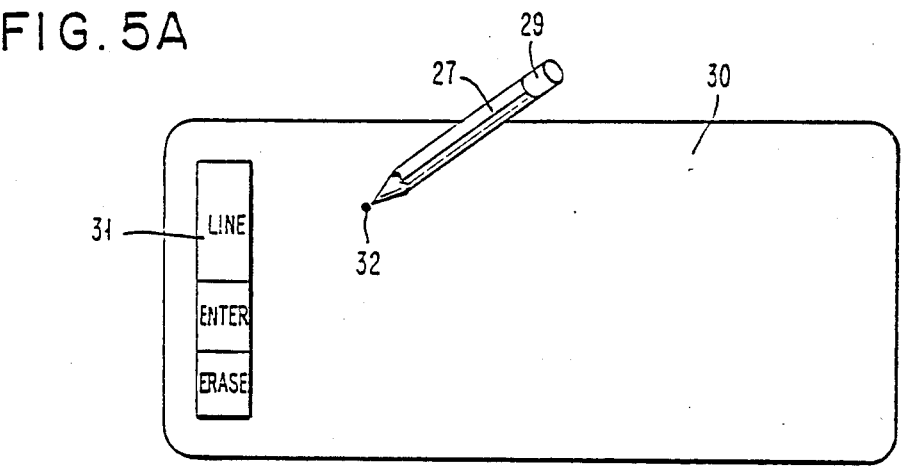
FIGS. 5A, 5B and 5C illustrate the retention, display and erasure properties of the invention.
Figure 5B:
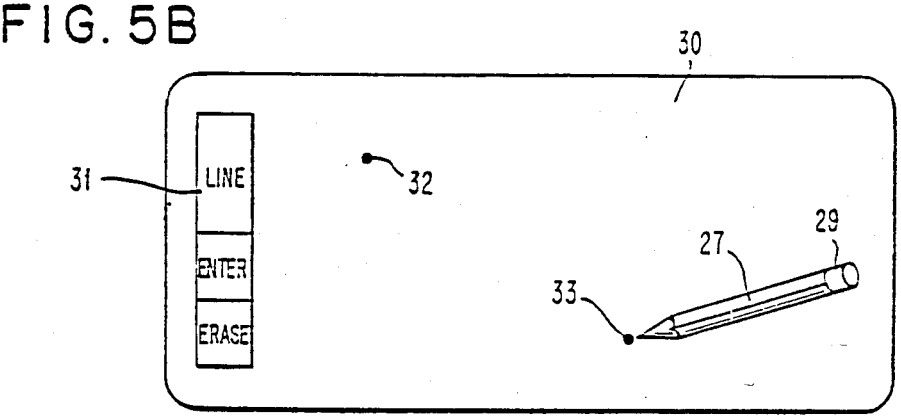
Figure 5C:
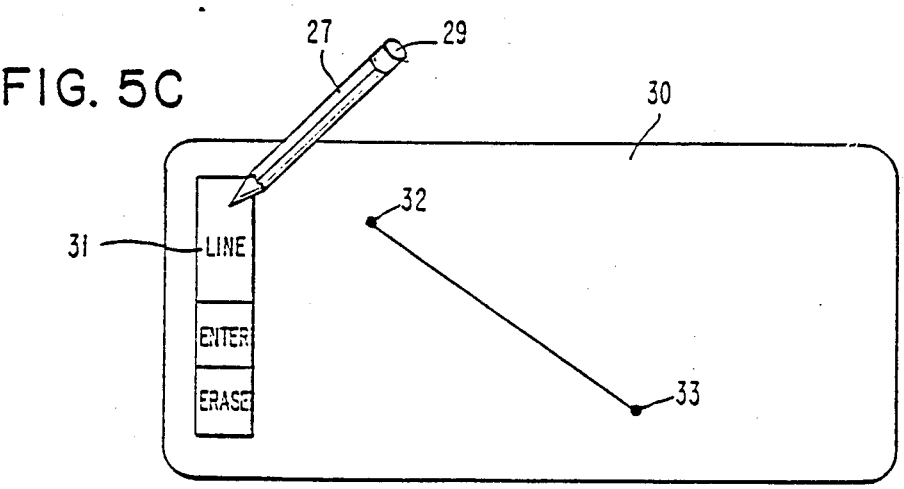

One example of the retention, display and erasure capabilities may be seen in connection with FIGS. 5A, 5B and 5C which, in essence, show a display screen 30 wherein a region 31 is divided into sections labelled line, enter and erase. With the capability of the invention of determining the location of the stylus, specific portions of the operating area can be assigned to communicate with the system. Audio acknowledgement is usually provided. Such portions are called "soft keys" and the audio is a simple "beep". The soft key region line is first touched and the system responds with a beep.

The system will identify the location of a point 32 as shown in FIG. 5A and display it. The soft key enter is touched. In FIG. 5B, the stylus 27 would then be positioned to identify a second point 33 while the system retained the display of point 32. In FIG. 5C, the stylus would again be positioned over the soft key signifying "enter". The soft key signifying line is touched and the system would then retain and display both points 32 and 33 and would display and retain a line between the points. If it became desirable to erase the line, movement of the stylus 27 to another soft key, assigned the function, erase will remove the line.

The system, since it operates by interrupting a beam of light, will recognize the optical properties of a stylus such as the different reflectivity of the eraser portion 29 or a difference in size or diameter of the stylus 27. Using the different optical property recognition capabilities, it is possible to achieve functions other than using soft keys.

Where the ability to recognize a difference in stylus cross-sectional size or material properties is employed, it is desirable to use a laser beam having a diameter smaller than that of the intended stylii. This simplifies the signal detection circuitry, and can be accomplished by bringing the beam to a controlled focus near the center of the surface area.

The behavior of a laser beam in the vicinity of a focus has been thoroughly studied in the art. The following is a simplified discussion which is adequate for the purpose of practicing the invention.

Assume that a laser beam of wavelength $\lambda$ is brought to a focus with waist diameter $D_o$. The beam will diverge around the focus at a rate determined by a characteristic length $Z_o$ given by equation 6.

$$Z_o = \frac{\pi D_o^2}{4\lambda} \qquad \text{Equation 6}$$

At a distance $Z$ from the focus (in either direction), the beam diameter $D$ will be as set forth in equation 7.

$$D = D_o \sqrt{1 + (Z/Z_o)^2} \qquad \text{Equation 7}$$

It will be observed that equation 6 is an even function of $Z$, hence the best arrangement is to produce a focus at the center of the operating surface area. The maximum diameter will then occur at the edges of the area. Let $Z=Z_e$ be the longest distance from the center of the area to an edge. With $\lambda$ and $Z$ fixed, the only free parameter in equation 6 is $D_o$. Minimizing $D(Z=Z_e)$ with respect to $D_o$, we find the relationship expressed in equation 8.

$$D_o = \sqrt{\frac{4\lambda Z_e}{\pi}} \qquad \text{Equation 8}$$

With this choice, the maximum beam diameter (at $Z=Z_e$) will be $D_o\sqrt{2}$. In the present example 12 inch square area, the distance $Z_e$ is about 20 cm. We then find (for $\lambda=6300\text{A}$) that $D_o$ should be 0.4 mm, leading to a maximum diameter of 0.6 mm at the edges. The laser and lenses must be located outside of the area, so that the distance to the focus after reflection from scanners and dihedral mirrors is about 1000 mm.

Thus, the problem reduces to forming a 0.4 mm waist at a distance of 1000 mm. A single lens would suffice if the laser divergence were 0.4 milliradians, mr. The divergence is approximately 0.8 mr, so that a beam-expander is required. This is made as follows. A lens of focal length $F_1$ brings the beam to a focus with waist diameter $D_1$ as expressed in equation 9.

$$D_1 = F_1 A_o \qquad \text{Equation 9}$$

where $A_o$ is the 0.8 mr initial divergence.

A second lens of focal length $F$ then forms a magnified waist at the desired 1000 mm distance. The final waist location $L$ and diameter $D$ are given as expressed by equations 10, 11 and 12.

$$L = F \frac{(L_1(L_1 - F) + Z_1^2)}{((L_1 - F)^2 + Z_1^2)} \qquad \text{Equation 10}$$

$$D = \frac{D_1 F}{\sqrt{((L_1 - F)^2 + Z_1^2)}} \qquad \text{Equation 11}$$

$$Z_1 = \frac{\pi D_1^2}{4\lambda} \qquad \text{Equation 12}$$

Here, $L_1$ is the distance from the initial waist to the second lens and $L$ the distance from that lens to the final waist. The parameter $Z_1$ represents the length scale for variations in beam diameter in the vicinity of the initial waist. This may be compared with equation 6.

A simple design procedure is to make an initial choice of F, the focal length of the second lens. Replace D in equations 11 and 12 with the desired waist diameter $D_o$ and L with the 1000 mm focusing distance. After some manipulation, one finds the required intermediate waist diameter $D_1$ to be as expressed in equation 13.

$$D_1 = \frac{FD_0}{\sqrt{((L - F)^2 + (Z_0^2))}} \qquad \text{Equation 13}$$

The focal length of the first lens may then be determined from equation 14.

$$F_1 = \frac{D_1}{A_0} \qquad \text{Equation 14}$$

The spacing $L_1$ between this waist and the second lens is then obtained by equation 15.

$$L_1 = \frac{F(L(L - F) + (Z_0)^2)}{((L - F)^2 + (Z_0)^2)} \qquad \text{Equation 15}$$

The intermediate waist is formed a distance $F_1$ from the first lens, hence the inter-lens spacing is $F_1 + L_1$.

It should be noted that the above equations are only valid if the lenses do not truncate the laser beam. Thus, the diameter of the first lens must exceed the input laser beam diameter. The required minimum diameter for the second lens $D2$ is easily calculated in accordance with equation 16.

$$D_2 = D_1 \sqrt{(1 + (L_1/Z_1)^2)} \qquad \text{Equation 16}$$

As an example, if F is chosen as 50 mm, then $F_1$ will be 26 mm and the lenses will be spaced about 78 mm apart. The second lens diameter will have to exceed 2 mm.

These are some considerations that may be of assistance to the practice of the invention that are associated with the other components. The scanner is required to deflect the laser beam through a total angle of about 90 degrees. A polygonal mirror driven by a small motor at 60 Hz is satisfactory and is preferred because a 90° angular range is considered large for most available vibrating scanners. In principle, an eight-sided polygonal scanner could provide eight 90-degree scans per revolution. However, the mirror is required to collect the returning retroreflected light. Because the facets move as well as rotate, the poorly collimated return light would be progressively vignetted or faded near the ends of the scans, leading to large variations in photocurrent. An improvement is achieved toward reducing this by using a 4-sided polygon, with oversized facets.

Returning to the embodiment of FIGS. 3A, 3B and 3C, the considerations involving the dihedral mirrors are as follows. The beam should leave the scanner parallel to the underside of the working area surface so that it will remain parallel after translation to the top surface. This will occur if the dihedral angle of the mirror is exactly 90 degrees. If the angle differs from 90 degrees by $\epsilon$, then the output beam angle will be in error by $2\epsilon$. If both dihedral mirrors have the same but incorrect angle, then the error can be compensated by adjusting the incident laser beam angle, or by tilting the scanner.

The dihedral mirrors may be constructed of strips of front-surfaced mirror cemented into holders machined from rectangular metal stock. The machining may be done in such a way as to ensure that the two holders would be identical, although the angles may differ from 90 degrees by a few minutes of arc which is easily compensated. The holders and other parts of the system are mounted on a flat base plate cut, for example, from jig-plate metal stock.

The retroreflectors may be made by attaching self-adhesive material to metal strips.

Several types of retroreflective material are available in the art. All are essentially semi-microscopic glass beads bonded to a metallic coating on a paper backing. The beads may be exposed, or else protected by a polymer coating. Uncoated retroreflective material has about 4 times the reflectivity of coated material, and works over a wider range of incident angles. However, it is susceptible to damage and is difficult to clean. With the system of the preferred embodiment, the signal-to-noise ratio is sufficiently large that it is possible to use protected or coated material without penalty.

Figure 6A:
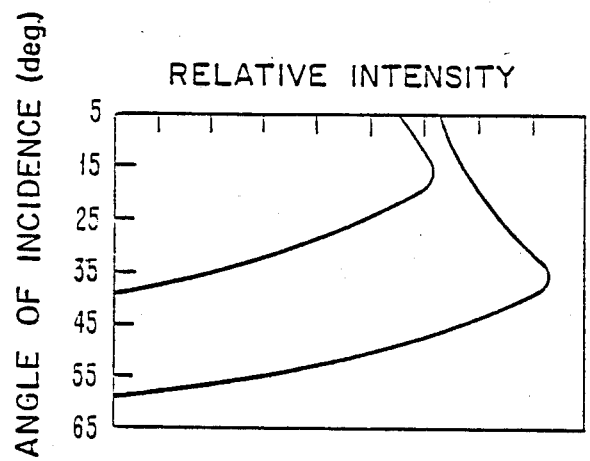
FIGS. 6A and 6B are graphs illustrating the properties of retroreflective material.
Figure 6B:
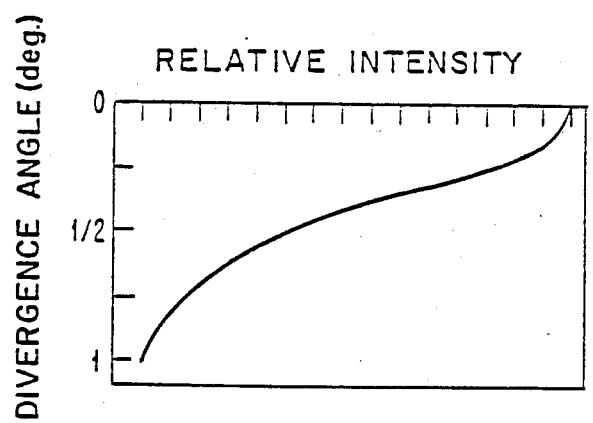

The variation in reflection efficiency of the retroreflective strips with angles of incidence and divergence is shown in FIGS. 6A and 6B. There is a rapid fall-off for angles of incidence beyond about 40 degrees.

Referring again to FIGS. 3A, 3B and 3C, it will be appreciated that the light reaching strips 13 and 15 may arrive at angles less than 45 degrees. Thus, for reflection efficiency, it is convenient to machine a number of small facets into the holders for strips 13 and 15, so as to tilt the retroreflector tapes in the correct direction.

Referring next to FIG. 6B, the angular distribution of the retroreflected light, with angles measured with respect to the incident beam is shown. Although the light is reasonably directional, the cone angle is much larger than the collection aperture. The aperture is rectangular. In the horizontal direction, the aperture will be truncated either by the scanner mirror or by the gap between the dihedral mirrors. An increase in the gap size will decrease the usable surface relative to the overall dimensions. In the vertical direction, the aperture is truncated by the surface on the one hand, and by either the base plate, the scanner or the dihedral mirrors on the other. Increasing any of the dimensions will make the apparatus dimensions thicker. For the illustrative example under discussion, a horizontal aperture of about $\frac{1}{2}$ degree is achieved, and a vertical aperture of about $\frac{1}{4}$ degree, with an overall thickness of about 1.2 inches. The system can use the least efficient but readily available coated retroreflective tape (3M-7922) may by the 3M Corporation, in order to collect about 0.02 percent of the initial laser power.

In the practice of the invention, the x-y coordinates of the stylus location are converted electronically to data processing compatible signals through the general functions of detection and preamplification, conversion to data processing logic signal levels, timing accommodation and conversion to digital numbers.

In the detection and preamplification functions, the following example specifications are employed. The duration of a complete scan is approximately 2 milliseconds (ms), with 1 ms devoted to each virtual scanning center. During this time, a 0.3 mm diameter beam sweeps over a transverse distance of around 300 mm. The rise and fall times thus will be of order 2 microseconds. The photodetector and amplifier chain must therefore have moderately wide-band performance and reasonably low spectral noise densities. A satisfactory unit for these specifications is the EG&G model SD-100 photodiode, driving a low-noise one-chip operational amplifier connected in a current-feedback mode as illustrated in connection with FIG. 7.

Figure 7:
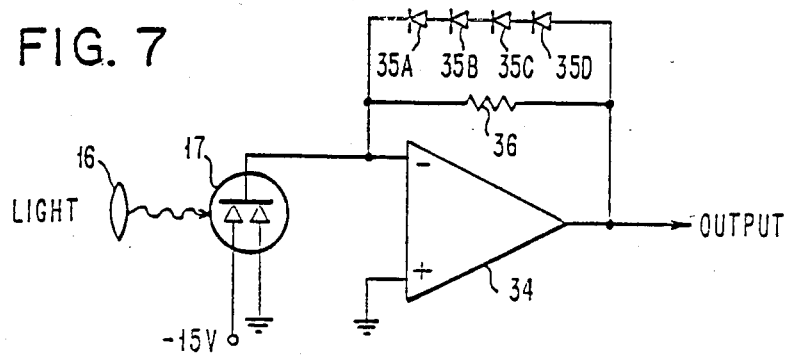
FIG. 7 is an example detector and preamplifier circuit.

Referring to FIG. 7, using the same reference numerals as FIGS. 3A, 3B and 3C for identical items, a small lens 16 collects the return light and focuses it onto the photodiode 17 connected between a negative voltage and ground. The photocurrent may be estimated as follows. It has been assumed that approximately 0.02 percent of the 0.5 mw laser power is returned to the detector. This is about 0.1 micro-watt. The photodetector 17 has a sensitivity of about 0.2 amps/watt at the laser wavelength, hence there will be about 0.02 micro-amps of signal current. At the output of the amplifier 34, the voltage signal-to-noise ratio is in excess of 100:1, although this is lowered somewhat by the fine-grained structure arising from the beaded retroreflective strips 13 and 15. Proper shielding and grounding techniques are required to avoid corrupting the signal with logic-circuit switching noise. In some cases, it may be desirable to place an interference filter in front of the photodetector to eliminate noise from ambient lighting.

Referring again to FIGS. 3A, 3B and 3C, it will be noted that the beam will be sent directly back to the detector as the scan shifts from dihedral mirror 18 to dihedral mirror 19. The amplifier 34 of FIG. 7 would be driven into saturation, requiring a long recovery time. A diode limiter is provided. Several diodes 35A-D are used in series across a large resistor 36 to provide a reasonably linear transfer function for signal currents in the normal range.

In the conversion to logic level signal function, the following considerations apply. A normal stylus is large enough to completely block the small diameter laser beam, resulting in nearly rectangular pulses with clean edges. The large signal-to-noise ratio allows the direct detection of the leading and trailing edges of each pulse without filtering. However, some efforts should be taken to eliminate direct current (DC) drifts.

Figure 8:
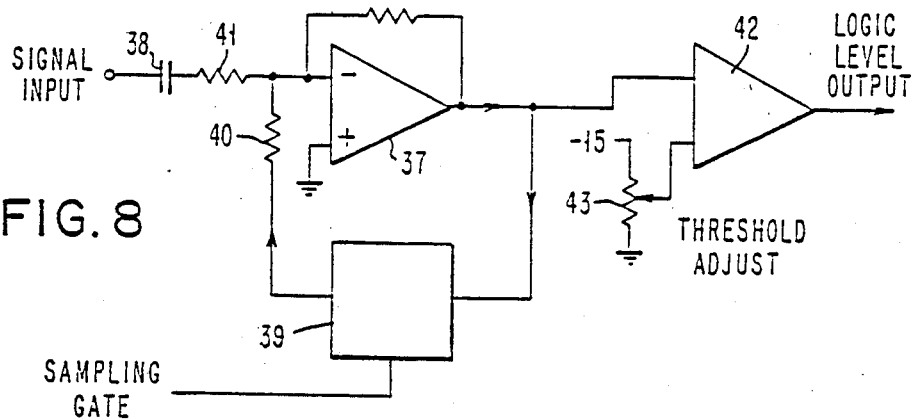
FIG. 8 is an example logic level conversion circuit.

Referring to FIG. 8, an illustrative circuit is provided in which the preamplified signal is fed to amplifier 37 for additional gain. The input to amplifier 37 is through a capacitor 38 which blocks slow DC drifts arising from such items as photodetector leakage currents A true zero is restored by sampling the output of amplifier 37 at a time when the scanning beam is known to be off the retroreflectors. The arrangement is similar to that used in conventional video cameras. Sampling is performed by a conventional sample-and-hold circuit 39 whose output is combined with the input to amplifier 37 with isolation by impedances 40 and 41, ensuring that zero output voltage corresponds to zero signal current. The output signal from amplifier 37 is fed to voltage comparator 42 whose output switches between logic-level 0 and logic-level 1 when a pulse is present. In the example circuit of FIG. 8, the comparison level is set manually with potentiometer 43, however, it could be obtained automatically by sampling the return signal from a retroreflector located just outside the active area.

Figure 9A:
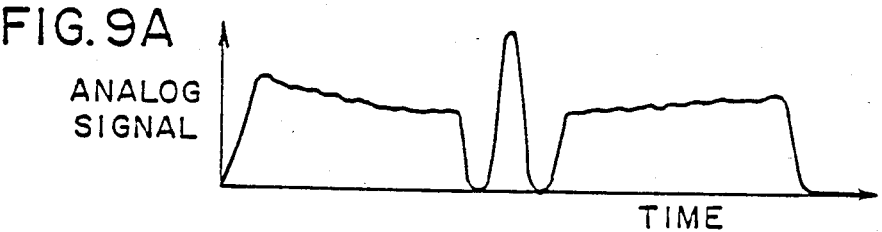
FIGS. 9A, 9B and 9C are illustrations of analog and digital signal levels.
Figure 9B:
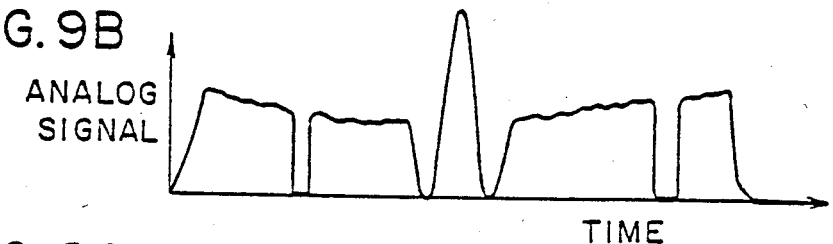
Figure 9C:
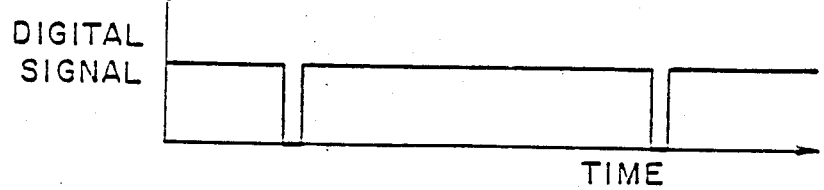

Referring next to FIGS. 9A, 9B and 9C, the signal levels are illustrated. FIG. 9A shows the signal when a stylus is absent. The disturbance near the center of the trace occurs when the beam scans across the gap between the dihedral mirrors. The overall variation in signal level results from vignetting of the return beam by the scanning mirror and by the effect of angle-ofincidence variations on the retroreflective strips. FIG. 9B shows the signal with a stylus present. FIG. 9C shows the output of the circuit of FIG. 8 after being gated with a blanking signal.

There are certain timing functions to be maintained. Circuitry is provided to form digital numbers representing the occurrence times of the four edges, that is the leading and trailing edge of each pulse, and to pass them to a computer for final analysis. Since the stylus position is obtained by triangulation, precision is required in measuring the angles. If cost were of no concern, a precision shaft encoder could be mounted on the motor. A less expensive alternative takes advantage of low cost of circuitry in combination with the large optical lever arm provided by the scanned laser beam.

Referring again to FIGS. 3A, 3B and 3C, two phototransistors 22 and 23 are mounted at the edges of strips 15 and 13, respectively. The laser beam strikes 23 just before it begins scanning 13, and strikes 22 just after it leaves 15. These detectors 22 and 23 provide reference timing markers which have a fixed relationship to the geometry of the system. The large optical lever arm from the virtual sources allows the use of simple photodetectors and yet provides precise timing markers.

Figure 10:
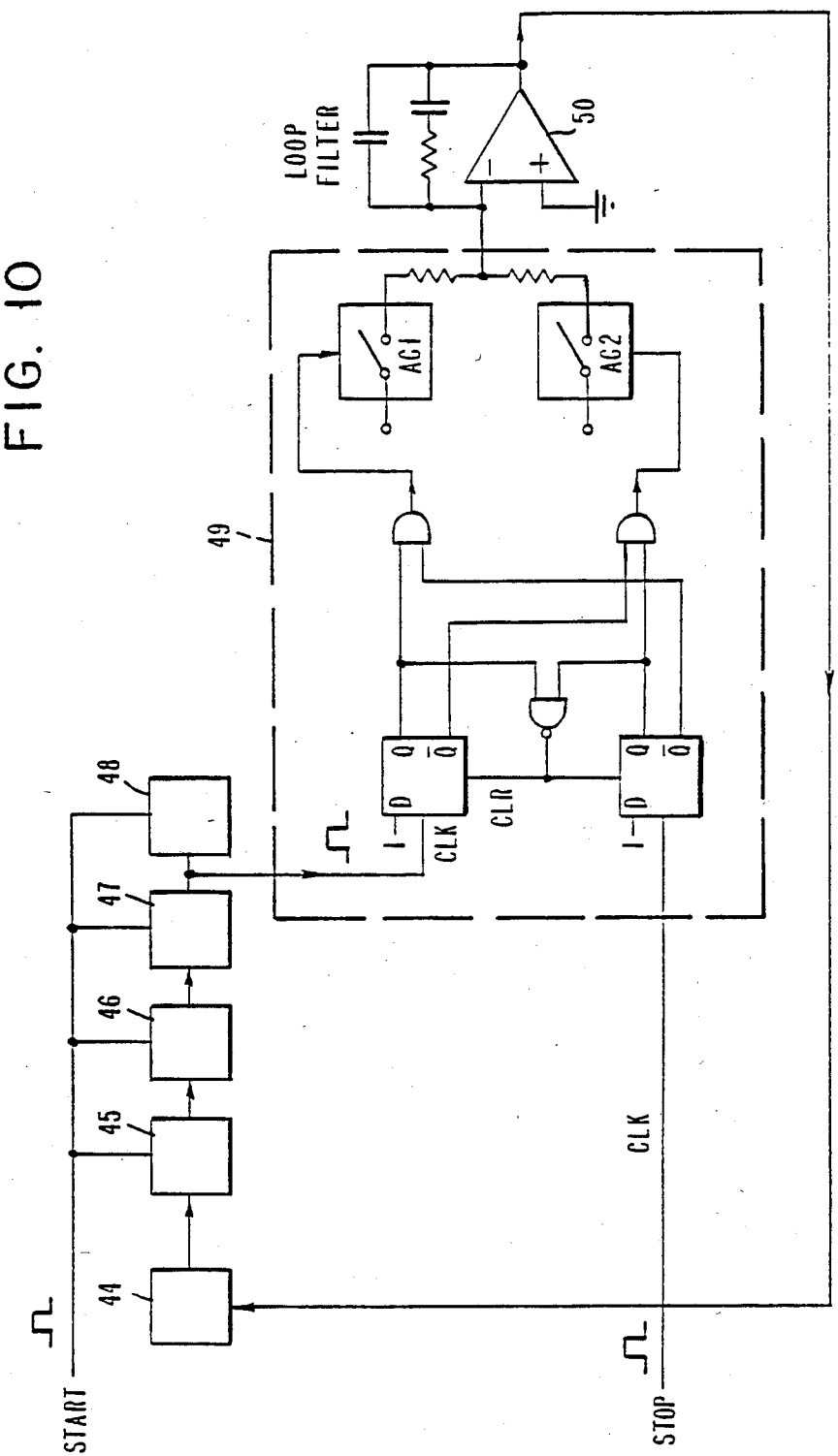
FIG. 10 is an example circuit for timing.

Referring to FIG. 10, an example circuit is provided. A voltage controlled oscillator, VCO, 44 is synchronized so as to provide a fixed number of clock pulses between these markers, each pulse corresponding to a precise angular increment. The VCO 44 is started by the pulse from detector 23 and its output counted by a 12 bit counter made up of 3 four-bit counters 45, 46 and 47 in series. The oscillator has a period of about $\frac{1}{2}$ microsecond, which determines the final resolution of the measurements. The 12-bit counter generates a pulse after a count of 4096 is reached, whose time-of-occurrence is compared with that of the pulse from detector 22, a standard digital phase detector circuit 49. If they differ, a correction voltage is applied to the VCO 44 through a holding circuit 50. The arrangement is similar to a phase-locked loop, except that the error is sampled and corrected only at discrete intervals. When the loop comes to equilibrium after a few scanner revolutions, there will be exactly 4096 pulses between the pulses from detector 23 and 22. Thus, the approximately 90 degree range of the scanner will be divided into 4096 equal increments. These increments are independent of the speed of the motor and the position of the mirror with respect to the drive shaft, and nearly independent of the alignment of the incoming laser beam. Further, the oscillator 44 need have only good short-term stability. The circuit of FIG. 10 uses only inexpensive integrated circuits. The phototransistors 22 and 23 may be replaced by small vertical strips of retroreflective tape, arranged to introduce coded pulse patterns into the data stream from the main signal amplifier. These pulse patterns may be detected and used to drive the timing servo loop.

The final function is the conversion to digital numbers. A complete set of data consists of four digital numbers representing the leading and trailing edges of each pulse. These are obtained by storing the value of the 12-bit counter of FIG. 10 when the relevant edge occurs. The data values are then transferred for processing which calculates the center of each pulse before performing the geometrical computations. Referring to the signal waveforms of FIGS. 9A and 9B, it is apparent that several blanking pulses are needed to limit detection to the relevant range of angles. In addition, gating signals are needed to activate the sample-and-hold gate 39 of FIG. 8 for amplifier 37 and to initiate and terminate a 'data ready' signal. These signals are obtained by decoding the binary counters. The 4-bit counter 48 is needed as some of the required pulses occur outside the measuring interval defined by the 12-bit counter. In addition, there is obtained a signal indicating successful stylus detection in which two and only two pulses are detected.

The resulting signal data is then processed in a suitable computer such as an IBM Series/1 minicomputer connected via a standard 16-bit input port. In order to further assist one skilled in the art example software instructions to execute the operations on the IBM Series 1 are contained in several subroutines. The x-y computations are provided in the Appendix sections labelled A to J. The retention, display and erase capabilities are set forth in the Appendix sections labelled K to AB.

It will be apparent to one skilled in the art that the principles set forth in the subroutines may be called by other programs where the invention is part of a larger application.

The subroutine of Appendix sections labelled A to J returns the x and y coordinates of the stylus. The device of the invention is referred to in the program as the "tablet". The subroutine consists of 3 parts that perform the following general functions.

(1) DATA ACQUISITION. This routine is highly specific to the computer hardware and to the interface circuitry. It causes the transfer of the four digital numbers representing the stylus pulse edges into main storage. The left and right edges of each pulse are then averaged to obtain an estimate of the pulse center.

(2) ANGLE CONVERSION. As discussed, the coordinates may be calculated in terms of two angles, $A_x$ and $A_y$. These angles are proportional to representative digital numbers, $N_x$ and $N_y$ representing the pulse centers so that the angles may be expressed as shown in equations 17 and 18.

$$A_x = C_1 + C_2 N_x \qquad \text{Equation 17}$$

$$A_y = C_3 + C_4 N_y \qquad \text{Equation 18}$$

The constants $C_1$–$C_4$ depend on the location of the phototransistors 22 and 23. They are obtained by a simple calibration procedure when the system is first assembled. The values are obtained as single-precision floating point numbers, stored and retrieved when the subroutine is first loaded into storage. Thereafter, the integers $N_x$ and $N_y$ are converted to floating point representation and $A_x$, $A_y$ obtained from equations 17 and 18 above as floating point numbers.

(3) STYLUS COORDINATES. These are calculated using equations 3 and 4. The tangent functions are evaluated using a standard numerical approximation. All calculations are done using single-precision floating point arithmetic with 24-bit binary fractions. The value of S is obtained by direct measurement of the area dimensions.

Referring to the subroutines in Appendix sections labelled A to J, each routine has functional statements. The manual to data processing interface of the invention is referred to as the tablet. The regions of the operating surface that are set aside for communication functional purposes are called soft keys. If the stylus is detected in one of the soft key regions, it is recognized as not having a valid x-y coordinate. The program involves four subroutines called XY, GETXY, TAN and READXY and operate as follows: XY reads raw data from the tablet. The numbers are basically the times at which the finger was detected relative to a timing mark. The program GETXY first converts these times into angles, and performs a trigonometric calculation to computer x-y coordinates. The subroutine TAN computes tangents for this calculation. The x-y coordinates so computed have their origin located at the scanning mirror, which is outside the actual tablet. These programs are completely specific to the particular example tablet under discussion, and would have to be entirely changed if some other device were used.

READXY then takes the X-Y values from GETXY and adjusts the values so that X=0, Y=0 correspond to the lower left-hand corner of the actual tablet. It then checks to see if the values are on the main part of the tablet or on the edges which correspond to "soft-keys".

The subroutines of Appendix sections labelled K to AB illustrate the steps in providing retention, display and erase capabilities.

The example system under discussion exhibits an accuracy of about 0.01 inches when used with stylii of various diameters and tip-shapes. These include pencils, the index fingers of the user, 1–4 inch diameter discs, etc. A typical user is able to select a point with about 0.05 inch accuracy using their fingers, despite being unable to see the actual point of contact once the finger is close to the surface. This indicates the ability of the device to find the center of the large-diameter finger with precision. Greater resolution is achieved where the system, as shown in FIG. 4, is positioned in the optical path between a user and a display so that immediate visual feedback is provided.

If a stylus with a small tip is used, points can be entered without visual feedback to an accuracy of about 0.01 inches. The stylus should be held perpendicular to the surface. Alternatively, a round optical comparator with a simple cross-hair can be placed on the surface for use in entering points.

The invention provides some 'human factors' considerations. The optical system senses the stylus position a small distance above the surface. As a result, it is moderately sensitive to the tilt of the stylus. This can lead to reduced accuracy if the system is operated without immediate visual feedback via a display of already entered data. When such feedback is presented, a user can easily make very precise adjustments by rocking a finger or other stylus slightly in the desired direction.

The manner of detection of the invention will sense all objects on the surface and as a result, the hand cannot be rested on the surface while operating. Any drafting aids, such as rulers or curves, have to be arranged to adhere to the surface as they cannot be held by the other hand. It is also possible to detect the orientation of a specially shaped stylus, or of two fingers placed on the operating area surface. Such information can be used in various ways, for example, to input directional as well as positional information. As discussed, the system can also determine the width or eraser end of a pencil-like stylus permitting thereby the thick end or eraser to be used for deletion.

The system, once the capabilities thus far described are available, is further adaptable to further operator-data processor interactive activity. Designs can be facilitated through the use of software-defined areas on the surface that can be touched by the stylus to direct the system to perform specific functions. Useful feedback can be provided by auditory indication, such as a "beep" device. The function direction regions of the operating area have been given the name soft keys. As previously described as an example of such use, consider entering the end points of a line. A soft key labelled 'LINE' is first touched. The system responds with an audible 'beep' to indicate key detection. The first end-point is touched, and is displayed immediately on a screen in a tracking mode. After the finger is lifted, the point remains displayed until a key labelled 'ENTER' is touched, the system again providing a beep. The second point is similarly entered, and the system responds by drawing the line.

Points can also be entered via a pushbutton activated by the other hand.

In order to facilitate the achieving of the high accuracy capability of the invention, as the principles of the invention are translated into different apparatus, the following analysis of some typical sources of error is advanced.

One source of error is in the precision of the coordinates. A measure of the accuracy can be appreciated from the following discussion. For the example square area of side S/2, in which $S_x = S_y = S$, the equations 1 and 2 can be expressed as the following equations 19 and 20.

$$X = \frac{S \tan(A_y)(1 - \tan(A_x))}{(1 - \tan(A_x) \tan(A_y))} \quad \text{Equation 19}$$

$$Y = \frac{S \tan(A_x)(1 - \tan(A_y))}{(1 - \tan(A_x) \tan(A_y))} \quad \text{Equation 20}$$

The major source of error is the measurement of the angles $A_x$ and $A_y$, provided that equations 19 and 20 are evaluated with sufficient numerical precision. The errors in x and y may be estimated by differentiating equations 19 and 20 with respect to the angles. Assuming $\delta A$ to be the magnitude of the angular errors, and $\delta X$ and $\delta Y$ to be the resulting coordinate errors. Then $$X = S\delta A \frac{|\tan(A_y)(1 - \tan(A_y)|\cos^{-2}(A_x) + |1 - \tan(A_x)|\cos^{-2}(A_y)}{[1 - \tan(A_x)\tan(A_y)]^2} \quad \text{Eq. 21}$$

$$Y = S\delta A \frac{|\tan(A_x)(1 - \tan(A_x)|\cos^{-2}(A_y) + |1 - \tan(A_y)|\cos^{-2}(A_x)}{[1 - \tan(A_x)\tan(A_y)]^2} \quad \text{Eq. 22}$$

These diverge if $A_x$ and $A_y$ both become $\pi/4$, as the scan lines are then essentially parallel. Consequently, it is necessary to restrict the stylus from this region. In general, a square or rectangular surface is desirable. Assuming the operating area to be a square of side A inside a larger square of side S/2, with one corner located at the scanner as shown in FIG. 3A. This leaves an unusable border of width $W = (S/2) - A$. The largest errors occur at the corner nearest where $A_x$ and $A_y$ become $\pi/4$. At this corner, we have:

$$\tan(A_x) = \tan(A_y) = \frac{1 - 2\frac{W}{S}}{1 + 2\frac{W}{S}} \quad \text{Equation 23}$$

which when substituted into equations 21 and 22 and expanding in the small parameter 2W/S while keeping the leading terms, the errors will then be as expressed in equation 24.

$$\delta X = \delta Y \simeq \left(\frac{S}{2}\right)\left(\frac{S}{2W}\right)\delta A \qquad \text{Equation 24}$$

The position errors will be about 100 δA inches per δA radians.

The measurement technique described in connection with FIG. 10 provides digital measurements of each angle to one part in 2048 or 11 bits. Since the range of $A_x$ and $A_y$ is about 0.4 radians, the quantization error introduces an angular uncertainty of 0.4/2048 radians or about 0.2 milliradians, mr. Thus, random errors of about 0.01 inches are to be expected.

There is a second type of error due to motion of the origin of the light produced by use of a polygonal scanning mirror. The considerations involved in this error may be appreciated by assuming a polygonal mirror whose sides are located a distance R from the rotation axis. The deflected beam appears to originate at the point of contact of the incident beam with the facet. This point moves slightly along the direction of the incident beam as the polygon rotates. The displacement δR along the beam is easily calculated in terms of the rotation angle $A_s$. For convenience, let this angle be zero when the facet is perpendicular to the incident beam. We then find:

$$\delta R = R(1 - \cos(A_s)) \qquad \text{Equation 25}$$

This motion can be resolved into motions along the X and Y axis through the following equations 26 and 27.

$$\delta X = R(1 - \cos(A_s))\cos(\pi/4) \qquad \text{Equation 26}$$

$$\delta Y = R(1 - \cos(A_s))\sin(\pi/4) \qquad \text{Equation 27}$$

Thus, for the specific example under discussion, the distance R is about 0.25 inches. The maximum value of $A_s$ during a scan is then somewhat less than 20 degrees, hence the variation in X and Y will be about 0.005 inches.

In accordance with the invention, having established the accurate coordinates of the position of the stylus, it is also necessary for accurate data entry to establish the point at which the coordinate values are to be selected.

In general, manual operation may be erratic, bouncy or subject to anticipatory motion. As the precision of the positioning increases, it becomes necessary to compensate for errors introduced because of these reasons.

The solution in accordance with the invention is to use the data history to specify a particular set of coordinates at some time before the specific decision on entering occurs. This is done by maintaining a file of coordinates with the oldest being dropped as a new one is added and selecting coordinates from the file at an earlier time to allow for anticipatory motion.

The removal of the stylus from the operating area surface is an excellent data entry type signal, however, there are several practical difficulties to be overcome. First, the last few measured points are likely to be in error, the amount depending on the details of the stylus design and the skill of the user. Second, the stylus may skip across the surface when moved rapidly, producing false removal signals. Finally, anticipatory muscular motions may disturb the stylus position at the critical moment.

The procedure of the invention is based on the concept that the user will have had the stylus at the correct place slightly prior to the decision to remove it. The procedure maintains a short 'history' file of coordinate values, detects liftoff with a 'debouncing' accommodation and then uses the data in the history file to place the final point.

In the manual-data processing interface of the invention this is accomplished with the apparatus of FIGS. 1 to 11 which indicates the presence of a finger or other stylus, as well as the coordinate values, say X and Y, and a subroutine is provided which stores the X-Y data in a memory element called a circular stack or ring-buffer so that a previous set of coordinates can be selected. With a circular stack, or ring-buffer type of memory element, coordinate data is needed sequentially until the stack is full, whereupon new coordinate data is added at the beginning, replacing the oldest data. The effect is to maintain a record of the last N readings, where N is the stack length.

Figure 11:
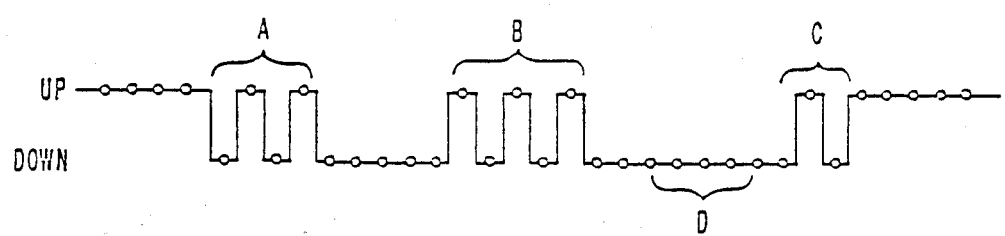
FIG. 11 is a schematic of stylus contact with a surface.

Referring to FIG. 11, there is illustrated the nature of the problem to be solved by showing a possible sequence of up/down indications as could occur as a manually moved stylus is lifted by an operator from an operating area surface to indicate a specific point. Each dot is representing one sampling point. At section A, the stylus has made initial contact, and then bounced twice. At section B, 3 bounces or missed readings occur as the stylus is moved, and then contact resumes. At section C, one more bounce occurs as the stylus is removed. It will be apparent that coordinates selected just before or just after the typical types of bounces will probably be in error. Therefore, a useful procedure should select for final processing only those coordinates measured where there is a clear contact indication such as at section D.

Figure 12:
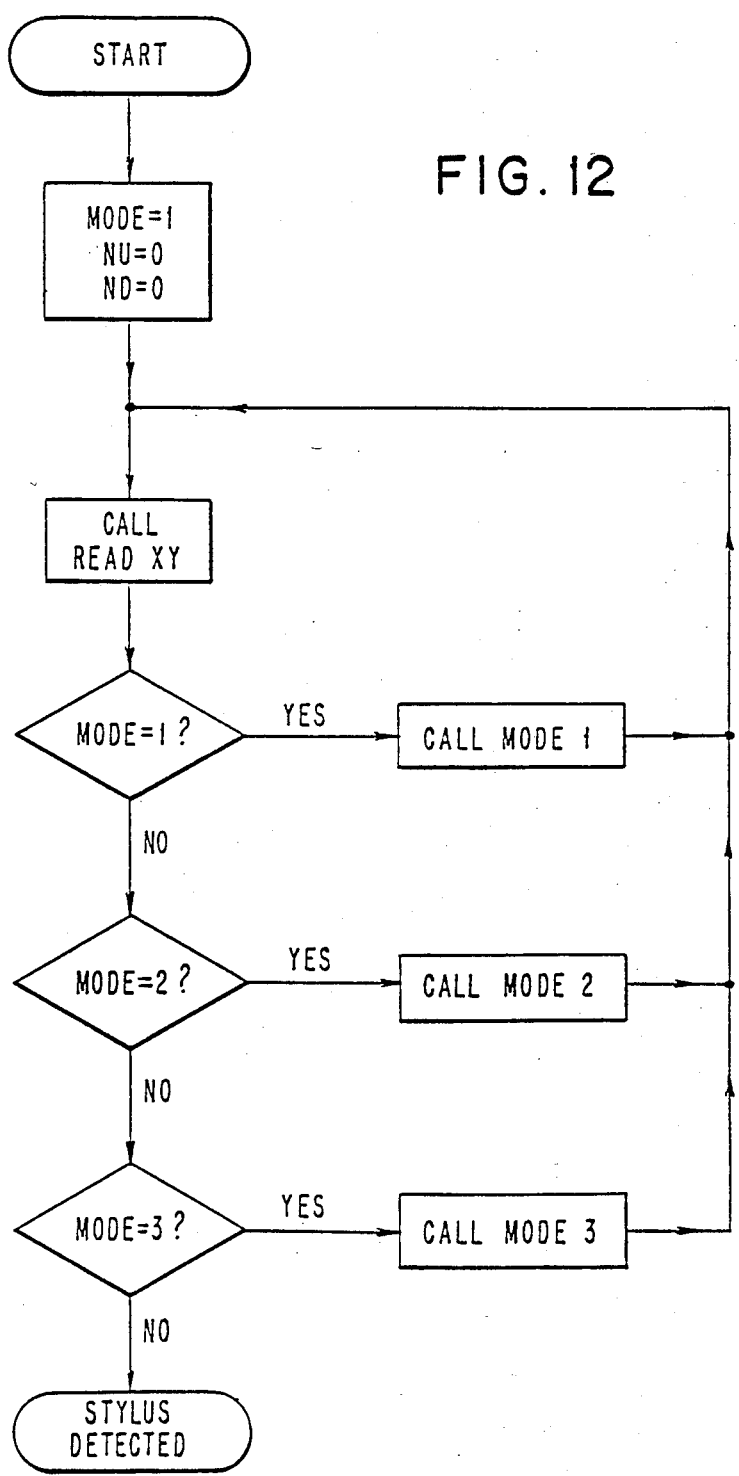
FIG. 12 is a flowchart of the data entry point selection procedure.

FIG. 12 shows a simplified flowchart of the data entry point selection procedure. There are 3 sections or phases. Referring to FIG. 12, the main portion of the algorithm or procedure consists of a loop with coordinate data being delivered via a subroutine called "READXY" described in connection with the Appendix. This loop runs until a standard sequence is detected, consisting of an initial steady 'stylus-down' indication, a first loss of contact and a final steady 'stylus-up' indication. In each pass through this loop, one reading is taken and then passed to one of the three section or phase subroutines for processing. The choice of subroutine is determined by the value of a variable called MODE. This variable is initialized to 1, and is then modified as appropriate by the subroutines.

Figure 13:
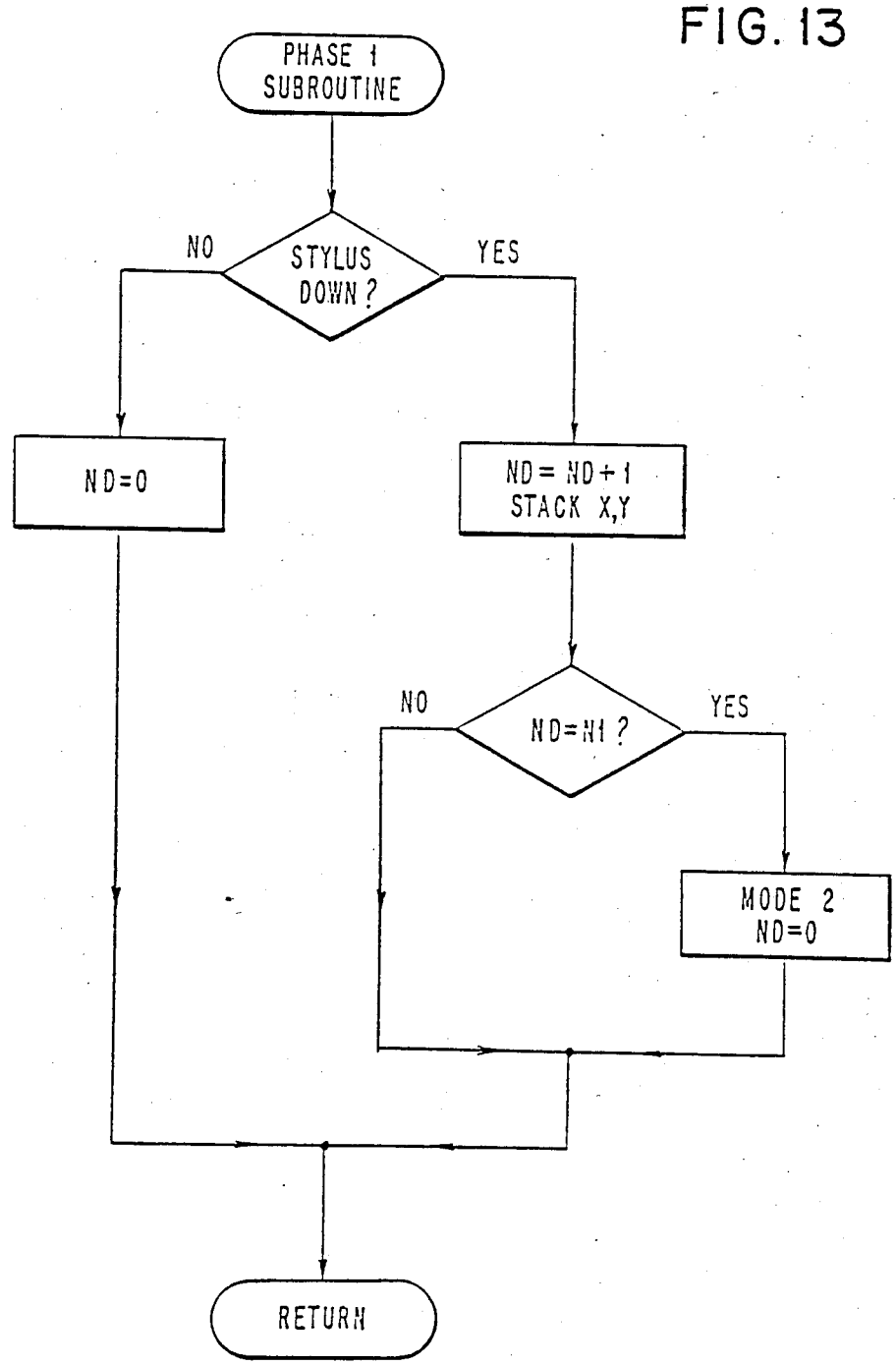
FIG. 13 is a flowchart of the stylus-down phase.

The PHASE1 subroutine illustrated in FIG. 13 'looks for' the initial steady presence of a stylus. It does this by counting the number of stylus-down indications (ND), stacking the X-Y coordinates and returning to the main loop until a pre-set number, N1, is reached. N1 must be chosen long enough to fill the stack to the desired depth. If a stylus-up indication is obtained first, ND is reset to zero. This ensures that ND cannot reach N1 as the result of a series of bounces. PHASE1 terminates itself when ND reaches N1. It does this by setting MODE equal to 2 before returning to the main loop. At the same time, ND is reset to zero for later use.

Figure 14:
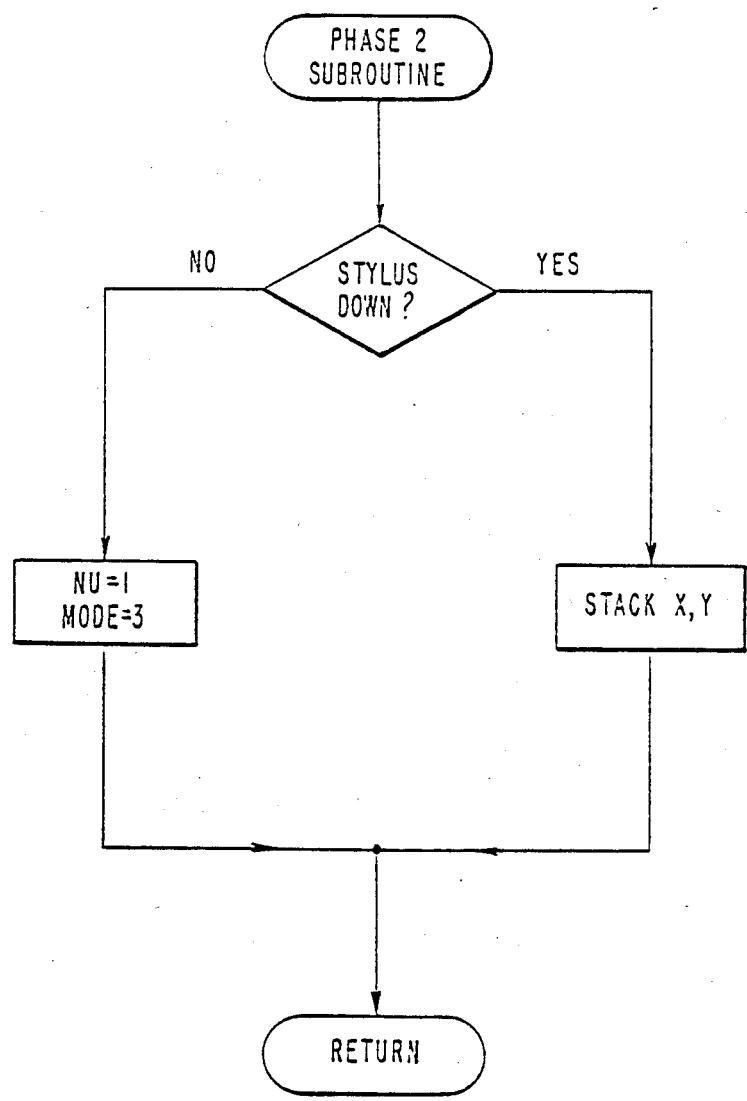
FIG. 14 is a flowchart of the first loss of contact phase.

The algorithm must now begin to look for a steady stylus-up indication, while continuing to stack data. The main problem is in dealing with stylus or finger bouncing, which may occur either during positioning or during liftoff. In particular, it is undesirable to stack erroneous data, which might contribute to the final plotted point if the user removes his stylus or finger soon after a few bounces. This situation is avoided by discontinuing stacking after the first stylus-up indication. This cannot be allowed to continue indefinitely, however, as the data in the stack would become out-of-date if the user moved the stylus. A constraint is set on the allowable sequence of events after the first stylus-up indication following PHASE1. In effect, the detection process is lengthened rather than compromise the accuracy of the final measurement. This portion of the algorithm is implemented by the PHASE2 and PHASE3 subroutines illustrated in FIGS. 14 and 15 respectively. The PHASE2 in FIG. 14 subroutine waits for the first stylus-up indication, while continuing to stack data. The subroutine then changes the MODE variable to 3 and sets the stylus-up counter NU to 1. Note that PHASE2 does not change the value of ND, which remains at zero.

Figure 15:
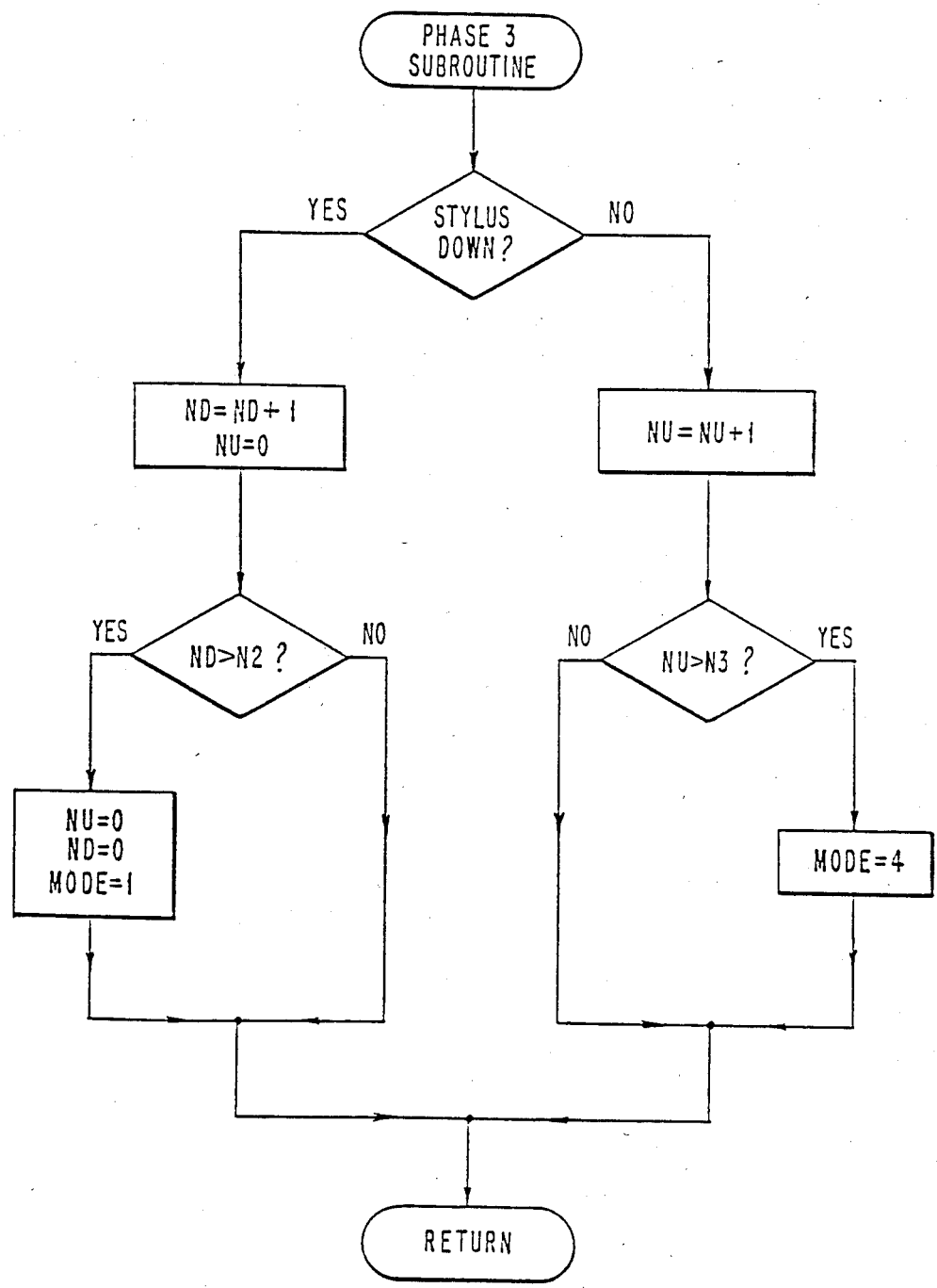
FIG. 15 is a flowchart of the stylus-up phase.

The PHASE3 subroutine in FIG. 15 then looks for the final steady stylus-up indication by incrementing NU until a value N3 is reached.

When this occurs, the subroutine changes the MODE variable to 4 before returning. The main program of FIG. 12 will interpret this is a successful detection sequence and the loop will finally terminate. To eliminate the possibility that NU might reach N3 by a series of bounces, NU is reset to zero each time a stylus-down indication occurs.

At the same time, ND is incremented. The entire algorithm is restarted if ND exceeds a value N2, indicating either that the user has changed his mind, or that an accidental bounce occurred. The restart is accomplished by resetting NU and ND to zero, and setting MODE to 1. This prevents the data in the stack from becoming 'stale' or out-of-date. Under the worst conditions, the algorithm will restart N samples after the first stylus-up indication, where N is the product of N2 and N3.

When the detection loop ends, several X-Y values, Na, are removed from the stack and averaged to yield the final coordinates. These are taken some distance back in the stack to remove any influence of the liftoff process. The optimum offset, i.e., 'backup' distance from the last recorded point, No, as well as Na and the parameters N1-N3 depend on the accuracy and reliability of the stylus detection mechanism, and to some extent on the method with which a user operates the device. From a time standpoint, 0.3 seconds is a good time to accommodate the anticipatory reaction time of most users.

Figure 16A:
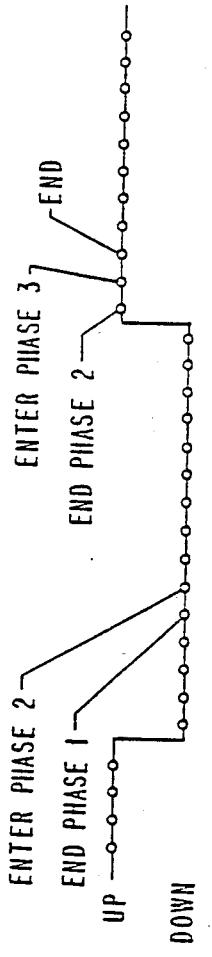
FIGS. 16A, 16B and 16C are examples of the interaction of the entry point selection procedure with stylus contact variations.
Figure 16B:
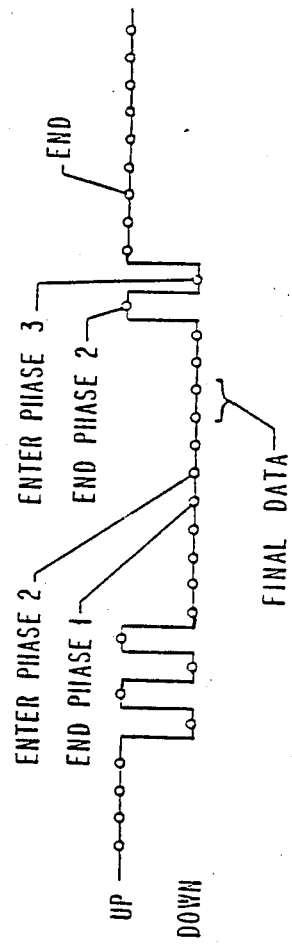
Figure 16C:
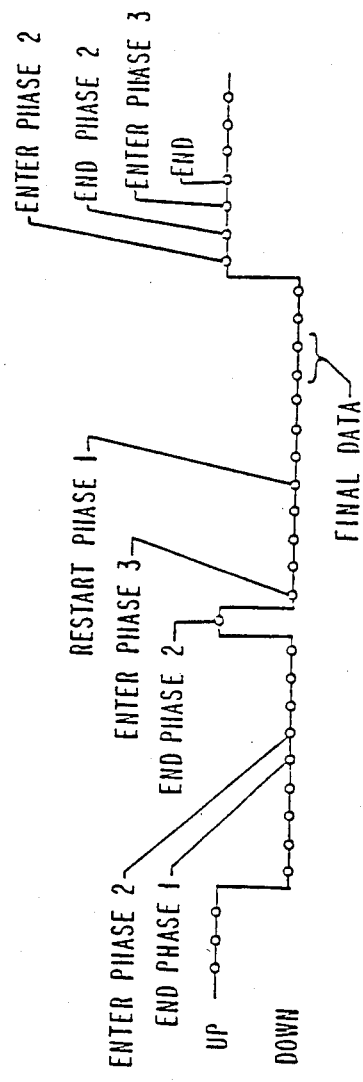

To further illustrate the algorithm, there are shown in FIGS. 16A, 16B and 16C several possible sequences of stylus signals. The small circles indicate sampling times. The arrows indicate the beginning of a new phase, the return to an old one and the occurrence time of the final coordinates. There is an assumption that N1=5, N2=3 and N3=3 and that there is a backup of two sampling times. Two points are selected for averaging, as shown. FIG. 16A shows an ideal sequence, while FIG. 16B shows a nearly ideal sequence with bounces only during initial placement and final liftoff. FIG. 16C shows a sequence interrupted by a bounce, leading to a restart.

The parameters N1-N3, the offset distance, No, and the number of points to be averaged, Na, have to be determined experimentally to provide good performance. There is one constraint which must be obeyed; the stack must hold at least No+Na data coordinate values before stacking is discontinued, in order to have enough data to perform the final average. However, if only this number are stored, then the first data point following the initial stylus-down indication might be included in the final average. This point is likely to be in error, as discussed previously. The possibility can be avoided by choosing N1>No+Na. It should be noted that the data point measured just before the stylus-up indication is automatically rejected, as long as No is greater than zero.

Apart from the above constraint, the parameters should be chosen as small as possible in order to achieve a rapid response time. If the device generates frequent false up and/or down indications, the parameters N1-N3 will have to be increased to provide reliable operation. Similarly, an increase in Na can improve the accuracy of a device producing large but random errors. Finally, an increase in No may be necessary for applications of the invention in which detection of the stylus is above the surface. This can occur where the finger is the stylus and the user tends to withdraw his finger slowly.

The algorithm of FIGS. 12 to 15 may be executed on an IBM Series 1 computer equipped with a storage display. In the Appendix sections AC to AG a listing of the instructions for a program capable of achieving the goals of the flowcharts of FIGS. 12-15 is provided. The set of instructions of FIGS. 18A-18E is called FINGER1 and includes some subroutine activity such as READXY described in connection with FIG. 11. The instructions also include several refinements not specifically addressed in the flowcharts of the Appendix sections labelled AC to AG. First, the computer controls a two-tone audio beeper. This provides the user with feedback at the critical steps of the detection process. A high-pitched beep is emitted when leaving PHASE1, and also when the final point is plotted, while a low-pitched beep is emitted if PHASE1 has to be restarted.

A second refinement involves another soft key region of the operating area surface, not illustrated, designated as a 'sink'. Touching this area allows the user to cancel an input step entirely by moving the stylus there before liftoff. This is preferable to entering an unwanted point and then undoing the effects later via a second step.

A third refinement includes, in addition to averaging several points to obtain the final coordinates, capability to calculate the rms scatter and no action is to be taken if it is excessive, e.g., more than 3 times the normal value. This effectively rejects points taken with the stylus in motion, and discards obviously noisy measurements. A low-pitched beep is emitted for feedback if a measurement is discarded.

Although the technique of FIGS. 12 to 15 and in the Appendix sections labelled AC to AG is employed in accordance with the interface of the invention the concept can also be usefully applied in totally different circumstances. As one example, the combination of a guidance control with a triggering mechanism. As another example, the positioning of manufacturing apparatus such as a wire-bonding machine, in which it is necessary to first position a semiconductor chip by human vision and control under a bonding tool, and then to actuate the actual bonding. This, and similar operations can be improved by maintaining a file of coordinates of the chip or guidance control, and repositioning under computer control after the final manual signal but prior to performing the actual step. In this way, the actuation would not disturb the final alignment. This could be carried further by first storing all the corrected bonding coordinates as entered by the operator, and then performing all the bonds as a second step.

In the example of a weapon such as a rifle equipped with an angular-rate or angular-acceleration transducer, and a torquing mechanism, in accordance with the invention, a short sequence of 2-dimensional angular acceleration measurements would be stored until the trigger was pulled, whereupon any disturbance caused by the trigger pull would be removed by the torquer before the gun was fired electrically.

BEST MODE FOR CARRYING OUT THE INVENTION

The preferred optical system of the invention is illustrated in connection with FIGS. 19A and 19B wherein dihedral mirrors are eliminated by adding a second scanner.

As the size increases, it has been found to be increasingly difficult and expensive to provide a sufficiently rigid mounting frame and adjustment to insure beam parallelism above and below the reference surface over the entire area requires considerable care.

In accordance with the preferred optical system as illustrated in connection with FIGS. 17A and 17B, a rigid beam is provided with two scanners mounted at opposite ends. Such an assembly would be mounted along one edge of an operating surface area and the remaining three sides lined with retroreflective tape. The tape does not need to be well aligned with respect to the scanners, although the scanning plane as defined by the bar must be aligned with respect to the desired operating area surface. Although two scanning mirrors are required, a single laser and/or photodetector channel can be used if the rotating mirrors are properly phased. This structure avoids a requirement for a reference surface, to prevent the stylus from interrupting any beams passing beneath the plane of detection as the beams are now confined to a single plane. This configuration is particularly well suited for use in front of a projection type large display.

Figure 17A:
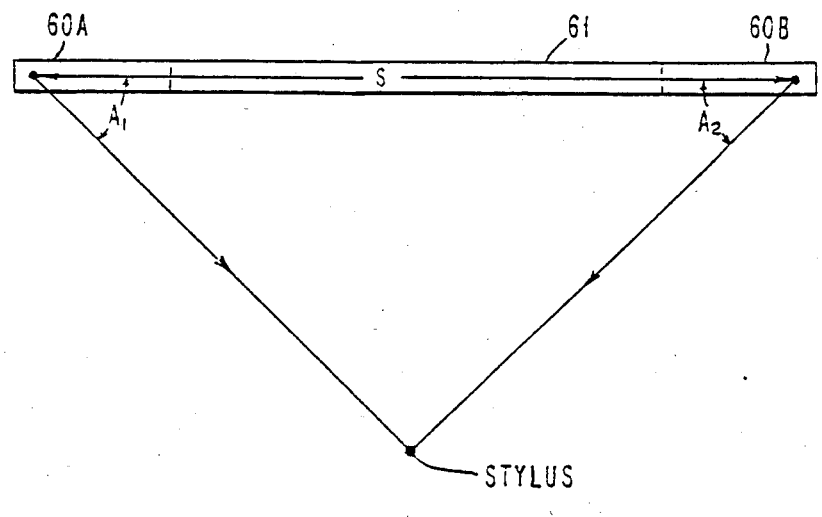
FIGS. 17A and 17B illustrate the preferred optical system of the invention.
Figure 17B:
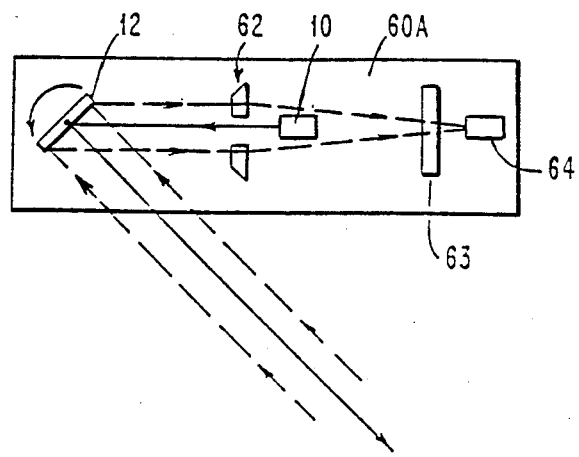

Referring next to FIGS. 17A and 17B, the preferred optical system is provided. In the light of the principles set forth, it will be apparent to one skilled in the art that two similar scanners 60A and 60B are mounted on a support 61 such as a bar, a definite distance apart. The left scanner 60A is shown in FIG. 17B wherein a source 10 provides a beam which is swept by scanner 12. The operating area is surrounded by retroreflective strips similar to 13 and 15 of FIGS. 3A, 3B and 3C but covering the remaining three sides. The strips may be bowed to improve the angle of incidence of the light. The reflected light returns along the beam as shown by the dotted lines to the scanner 12 and through the split converging lens 62 and converging lens 63 to sensor 64.

A start pulse is easily obtained from the detector, as the mirror will reflect the laser light directly into the detector lens before scanning the surface. The stylus coordinates can then be obtained by a simple trigonometric calculation using the angle from each scanner and the known scanner separation distance S. Thus, if the angles measured by the scanners are A1 and A2, then the X and Y coordinates of the stylus are set forth in equations 28 and 29.

$$X=(S/2)((TAN\ (A1)-TAN\ (A2))/(TAN\ (A1)+TAN\ (A2))) \quad \text{Equation 28}$$

$$Y=(S)(TAN\ (A1)\ TAN\ (A2))/(TAN\ (A1)+TAN\ (A2)) \quad \text{Equation 29}$$

What has been described is an interface between manual operation and data processing involving the dual capability to optically determine a precise location of a manual indicator and to select which of the manually traversed exact locations represents the specific data desired. The capabilities of the invention provide both high accuracy and greater flexibility than previously available.

YO981-040

ATTACHMENT A

45A

APPENDIX

Section A

```
*****************************************************************
*** THIS SUBROUTINE FIRST CALLS READXY TO GET X AND Y VALUES    **
*** MEASURED WITH RESPECT TO AN ORIGIN LOCATED AT THE LASER SCANNER. **
*** IT THEN SHIFTS THE ORIGIN TO THE TABLET COORDINATE SYSTEM, AND **
*** CHECKS TO SEE IF THE VALUE IS ON THE ACTIVE TABLET AREA OR ON **
*** THE AREA RESERVED FOR SOFT KEYS. A RETURN CODE (RCODE) IS SET AS **
*** FOLLOWS: -1: NO STYLUS +1: STYLUS ON SOFT KEY: 0: STYLUS ON **
*** ACTIVE TABLET AREA. IF A SOFT KEY, ITS VALUE IS RETURNED TO THE **
*** MAIN (NOT CALLING) PROGRAM IN THE VARIABLE KEY              **
*****************************************************************
READXY    PROGRAM  START,MAIN=NO
          SUBROUT  READXY
          ENTRY    READXY
          EXTRN    GETXY,BEEP,ADDCODE,ADDCAL
          EXTRN    KEY,KEYNUM,X,Y,VX,VY,RCODE,ADDX,RETCODE
          EXTRN    XOFFSET,YOFFSET,VSCALE
*****************************************************************
```

```
START      EQU   *
           MOVE  KEY,0       0:NOT IN USE +N:SHAPE -N:COMMAND
           MOVE  RCODE,0     +1:SOFTKEY  0:PANEL -1:NO READING/OFF SCALE
           CALL  GETXY,ADDCODE,ADDCAL,ADDX
           IF    (RETCODE,EQ,0),GOTO,RD2
           MOVE  RCODE,-1
           GOTO  ENDRDPN
RD2        USER  *+2         CALCULATE TRUE X AND Y IN FLOAT AND FIXED
           FMV   X,FR0
           FS    XOFFSET,FR0 SUBTRACT OFFSET FROM ORIGIN (X)
           FMV   FR0,X
           FMVC  FR0,XI
           FMV   Y,FR0
           FS    YOFFSET,FR0 SUBTRACT OFFSET FROM ORIGIN (Y)
           FMV   FR0,Y
           FMVC  FR0,YI
           BAL   RETURN,B1
***************************************************************
*** SEE IF ON ACTIVE TABLET AREA. IF NOT, CALL SORTER TO FIND IF  ***
*** ITS A SOFT KEY, AND IF SO, WHICH ONE                          ***
***************************************************************
```

Section B

```
           IF    (X,LT,0,FLOAT),THEN
             SUB XI,1
           ENDIF
           IF    (Y,LT,0,FLOAT),THEN
             SUB YI,1
           ENDIF
           IF    (XI,GT,XMX),OR,(YI,GT,YMX),OR,(XI,LT,0),OR,(YI,LT,0),THEN
             CALL SORTER
           ENDIF
ENDRDPN    EQU   *
           IF    (RCODE,EQ,1),THEN
             CALL BEEP,HITONE
           ENDIF
           RETURN
***************************************************************
           SUBROUT SORTER
           IF  (XI,EQ,-1),AND,(YI,GE,0),AND,(YI,LE,11),GOTO,LTEDGE

IF  (YI,EQ,11),AND,(XI,GE,0),AND,(XI,LE,10),GOTO,TPEDGE
           MOVE RCODE,-1
           GOTO ENDSORT
LTEDGE     MOVE KEYNUM,YI
           ADD  KEYNUM,YI
           MOVE #1,KEYNUM
           MOVE KEY,(KEYTABL,#1)
           MOVE RCODE,1
           GOTO ENDSORT
TPEDGE     MOVE KEYNUM,24
           ADD  KEYNUM,XI
           ADD  KEYNUM,XI
           MOVE #1,KEYNUM
           MOVE KEY,(KEYTABL,#1)
           MOVE RCODE,1
           GOTO ENDSORT
ENDSORT    EQU  *
           RETURN
```

Section C

```
*****************************************************************
*** VARIABLES FOR THIS SUBROUTINE                              **
*****************************************************************
NREQ     DC    1F'3'
NAV      DC    1F'3'
PPDIV    DC    1E'3.0'
XAV      DC    1E'0.0'
YAV      DC    1E'0.0'
XI       DC    1F'0'
YI       DC    1F'0'
XMX      DC    1F'10'
YMX      DC    1F'10'
KEYTABL  DC    X'FFFDFFFDFFFDFFFDFFF6FFF7FFF8FFF9FFFA'
         DC    X'FFFBFFFCFFFE000100030005000700009'
         DC    X'000B00000000000000000000'
** 1:AMP 3:RES 5:CAP 7:GND 9:DOT 11:DIODE
HITONE   DC    X'2000'
         ENDPROG
         END
```

Section D

```
*****************************************************************
*** SUBROUTINE TO GET (X,Y) FROM TOUCH PANEL. XY IS A DRIVER    ***
*** PROGRAM FOR THE PANEL HARDWARE. IT IS CALLED TO GET THE RAW ***
*** DATA. THE X,Y C VALUES ARE CALCULATED FROM THEM, USING      ***
*** CALIBRATION CONSTANTS STORED IN THE PROGRAM WHICH CALLED    ***
*** THIS SUBROUTINE. ADDCAL IS THE ADDRESS OF THESE CONSTANTS,  ***
*** WHICH CONSIST OF 4 DOUBLE-PRECISION FLOATING POINT NUMBERS  ***
*** FOLLOWED BY A SINGLE PRECISION FLOATING POINT NUMBER EQUAL TO ***
*** TWICE THE TABLET SIDE. THIS SUBROUTINE RETURNS X, Y A RETURN ***
*** CODE AND THE RAW DATA T1 AND T2.                            ***
*** ADDX IS ADDRESS OF X (WHICH MUST BE FOLLOWED BY Y) IN THE   ***
*** CALLING PROGRAM. BOTH SINGLE PRECISION FLOATING POINT NUMBERS **
*** ADDCODE IS LOCATION FOR RETURN CODE IN CALLING PGM. MUST BE ***
*** FOLLOWED BY T1 AND T2. EACH SINGLE PRECISION INTEGERS       ***
*** THE CODE IS 0 FOR SUCCESS, -1 FOR NO FINGER                 ***
*** THE CALCULATION IS GIVEN BY:                                ***
*** A=S.TAN(A2)(1-TAN(A1))/(1-TAN(A1)TAN(A2)). SWAP 1,2 FOR Y   ***
*** A1=RR1(1)+T1.RR1(2), A2=RR2(1)+T2.RR2(2). T1,T2 ARE DETECTED ***
*** PULSE CENTER TIMES RELATIVE TO START PULSE.                 ***
*** JAMES L. LEVINE. FINAL FORM 11/5/80                         ***
*****************************************************************
GETXY    PROGRAM  START,MAIN=NO,PARM=3
         SUBROUT  GETXY,ADDCODE,ADDCAL,ADDX
         ENTRY    GETXY
         EXTRN    TAN
         EXTRN    XY
START    EQU   *
         CALL  XY,(RETCODE)    GET RAW DATA
         IF    (RETCODE.NE.0),GOTO,ENDGET
***      START BY CONVERTING TIMES TO ANGLES USING CALIBRATION CONSTANTS
         USER  *+2
         MVW   ADDCAL,R3
         MVD   (R3,32),S       PICK UP S FROM CALLING PGM (11/5/80)
         FMVC  T1,FR0
         FMD   (R3,8),FR0
         FAD   (R3),FR0        FR0=RR1(1)+RR1(2)*T1
         FMV   FR0,ANG1        THIS IS FIRST ANGLE
         FMVC  T2,FR0
         FMD   (R3,24),FR0
         FAD   (R3,16),FR0
         FMV   FR0,ANG2
         BAL   RETURN,R1
***      NOW CALCULATE TANGENTS
         CALL  TAN,(ANG1),(TAN1)
         CALL  TAN,(ANG2),(TAN2)
         USER  *+2
         MVW   ADDX,R3
         FMV   TAN1,FR1        FR1=TAN1
         FMV   TAN2,FR2        FR2=TAN2
         FMV   FR1,FR0         FR0=TAN1
         FM    FR2,FR0         FR0=TAN1*TAN2
         FS    FP1,FR0         FR0=TAN1*TAN2 - 1
```

Section E

```
        FMV   FR1,FR3         FR3=TAN1
        FS    FP1,FR3         FR3=TAN1 - 1
        FM    FR2,FR3         FR3=TAN2(TAN1 - 1)
        FD    FR0,FR3         FR3 = TAN2(TAN1 - 1)/(TAN1*TAN2-1)
        FM    S,FR3           FR3=X
        FMV   FR3,(R3)        STORE X IN CALLING PGM
        FMV   FR2,FR3         FR3=TAN2
        FS    FP1,FR3         FR3=TAN2-1
        FM    FR1,FR3         FR3=TAN1(TAN2-1)
        FD    FR0,FR3         FR3=TAN1(TAN2-1)/(TAN1TAN2-1)
        FM    S,FR3           FR3=Y
        FMV   FR3,(R3,4)      STORE Y IN CALLING PGM
        BAL   RETURN,R1
ENDGET  EQU   *
        USER  *+2
        MVW   ADDCODE,R3
        MVW   RETCODE,(R3)
        MVW   T1,(R3,2)
        MVW   T2,(R3,4)
        BAL   RETURN,R1
        RETURN
**************************************************************
RETCODE  DC    1F'0'
T1       DC    1F'0'
T2       DC    1F'0'
ANG1     DC    1E'0.0'
ANG2     DC    1E'0.0'
TAN1     DC    1E'0.0'
TAN2     DC    1E'0.0'
S        DC    1E'29.5'
FP1      DC    1E'1.0'
        ENDPROG
        END
```

Section F

```
**************************************************************
***  DRIVER SUBROUTINE TO READ RAW DATA FROM TOUCH PANEL    ***
***  SETS UP DIGITAL INPUT UNIT TO INTERRUPT ON HARDWARE LEVEL ***
***  ZERO, WAITS FOR INTERFACE TO GENERATE INTERRUPT, THEN  ***
***  READS DATA WORDS, PACKS PROPERLY INTO BINARY WORDS AND ***
***  PASSES BACK DATA AND RETURN CODE TO CALLING PROGRAM    ***
***  ADDCODE IS ADDRESS OF RETURN CODE IN CALLING PGM, WHICH ***
***  MUST BE FOLLOWED BY THE RAW DATA, ALL 2-BYTE INTEGERS  ***
**************************************************************
XY      PROGRAM START,MAIN=NO,PARM=1
        SUBROUT XY,ADDCODE
        ENTRY   XY
START   EQU   *
        USER  *+2
        MVWI  0,RETCODE
        MVA   DBUFF,ADBUFF
        MVWI  4,DBUFFCNT
        MVA   DGIT,INT         POINT TO FULL INTERRUPT HANDLER
        BAL   READIN,R5
***     WILL INVERT BITS TO GET TRUE DATA, TESTING BIT 15 FOR 1   ***
        MVWI  4,R7
        MVA   DBUFF,R1
INVLOOP MVW   (R1),R3
        VR    R3
        TWI   X'0001',R3
        JN    C3              JUMP IF THE BIT IS 1 (DATA VALID)
        MVWI  -1,RETCODE
C3      SRL   4,R3
        MVW   R3,(R1)+
        JCT   INVLOOP,R7
        MVW   DBUFF,XTIM
        AW    DBUFF+2,XTIM
        MVW   DBUFF+4,YTIM
        AW    DBUFF+6,YTIM
        MVW   ADDCODE,R3
        MVA   RETCODE,R1
        MVWI  4,R7
        MVFN  (R1),(R3)
        BAL   RETURN,R1
        RETURN
**************************************************************
READIN  EQU   *
        MVA   INT,X'F8'       STORE HANDLER ADDRESS IN INTERRUPT TABLE
        IO    DIRESET         RESET DI JUST IN CASE
        IO    DIPREP          PREPARE DI TO INTERRUPT ON LEVEL 0
        MVWZ  DIECB,R0        MARK DI EVENT NOT READY
        IO    DIARM           ARM EXTERNAL SYNCH
        BAL   SVC,R7          WAIT FOR INTERRUPT
        DC    A(WAIT)
        DC    A(DIECB)
        B     (R5)            RETURN TO CALLER
**************************************************************
```

Section G

```
***     IMMEDIATE ACTION ROUTINE TO HANDLE INTERRUPT                    ****
***     THE SUPERVISOR WILL START THIS ROUTINE ON LEVEL 0               ****
***     AFTER INTERRUPT, R1 POINTS TO 'INT', R7 HOLDS                   ****
***     DI DEVICE STATUS INFO, OTHER REGISTERS ARE CLEARED              ****
***     NOTE: THE ADDRESS OF THIS ROUTINE WAS STORED ABOVE IN 'INT'     ****
**********************************************************************
DOIT        EQU    *
***     READ 3 WORDS, THEN TEST FLAGS AND DISTRIBUTE                    ****
            IO     DIREAD            READ DI AND RESET SYNCH
            MVW    DIDATA,(R1,2)*    STORE A WORD IN DBUFF
            AWI    2,(R1,2)          BUMP THE BUFFER POINTER
            SWI    1,(R1,4)          DECREMENT THE BUFFER COUNTER
            JNP    QUITIT            QUIT AFTER 4 READINGS
            LEX
QUITIT      EQU    *
            DIS    1                 DISABLE SUMMARY MASK (INHIBIT INTERRUPTS)
            IO     DIRESET
            EN     1                 ENABLE SUMMARY MASK
            BAL    SVCI,R7           POST DI EVENT COMPLETE
            DC     A(POST)
            DC     A(DIECB)
            DC     X'FFFF'           POST CODE
            B      SUPEXIT           RETURN TO MAIN PROGRAM
***     END OF IMMEDIATE ACTION ROUTINE                                 ****
**********************************************************************
ENDIO       EQU    *
            BAL    RETURN,R1         BACK TO EDX
**********************************************************************
***     DATA SECTION                                                    ***
**********************************************************************
DIPREP      DC     X'60640001'
DIRESET     DC     X'6F640000'
DIARM       DC     X'69640000'
DIREAD      DC     X'0064'           HALF OF IDCB FOR DI
DIDATA      DC     X'0000'           2ND HALF OF IDCB-DATA APPEARS HERE
***     KEEP THE NEXT 3 VARIABLES TOGETHER                              ****
DIECB       ECB
DCINT       DC     A(INT)
INT         DC     A(DOIT)           ADDRESS OF DI INTERRUPT HANDLER
ADBUFF      DC     A(DBUFF)          (R1,2)
DBUFFCNT    DC     F'4'              (R1,4)
DBUFF       DC     4F'0'             TEMPORARY BUFFER FOR DIDATA
RETCODE     DC     1F'0'
XTIM        DC     1F'0'
YTIM        DC     1F'0'
**********************************************************************
***     END OF DATA SECTION                                             ****
**********************************************************************
```

Section H

```
**********************************************************************
***  PROGRAM TO CALCULATE TANGENT. SINGLE PREC. FLOATING PT CALC      **
***  ANGLE IN RADIANS STORED AT ANGADD IN MAIN CALLING PGM            **
***  RESULT RETURNED AT RETADD IN CALLING PGM                         **
**********************************************************************
TAN         PROGRAM START,MAIN=NO,PARM=2
            SUBROUT  TAN,ANGADD,RETADD
            ENTRY  TAN
START       EQU    *
            USER   *+2
***     FIRST TAKE ABSOLUTE VALUE OF ANGLE AND SAVE SIGN                ***
            FMV    ANGADD*,FR0
            FMV    FR0,X
            JN     NEG               JUMP IF ANGLE NEGATIVE
            MVD    FP1,SIGN          AND STORE SIGN
            J      CONT1
NEG         MVD    FPMIN,SIGN        STORE SIGN
            FMV    FR0,X
            RBTWI  X'8000',X         RESET THE SIGN BIT
            FMV    X,FR0
***     NEXT DIVIDE BY PI/4 AND SEPARATE INTO INTEGER AND FRACTION ***
CONT1       EQU    *                 FR0 NOW HOLDS ABSOLUTE VALUE OF ANGLE
            FD     PI4,FR0           DIVIDE BY PI OVER 4
            FMVC   FR0,Q             STORE INTEGER PART
            FMVC   Q,FR2             CONVERT BACK TO FLOATING POINT
            FS     FR2,FR0           FR0 CONTAINS FRACTIONAL PART (R)
***     NEED TO KNOW IF Q IS EVEN OR ODD--CHECK LAST BIT                ***
***     IF EVEN, W=R.  IF ODD, W=1-R  WILL LEAVE W IN FR0               ***
            TWI    X'0001',Q         TEST BIT 15 IN Q
            JZ     EVEN              JUMP IF EVEN
            FMV    FP1,FR3           FR3=1
            FS     FR0,FR3           FR3=1-R
            FMV    FR3,FR0           STORE BACK IN FR0, CALL THIS W
```

```
EVEN       EQU  *                    EVEN, LEAVE FRO ALONE
***        COMPUTE U=0.5W**2, LEAVE IN FR1                              ***
           FMV  FR0,FR1              WILL FORM U=0.5W**2
           FM   FR0,FR1
           FM   FPHF,FR1             FR2 HOLDS U
***        COMPUTE WP(U)=W(A+U), LEAVE IN FR2                           ***
           FMV  FR1,FR2              FR2 HOLDS U ALSO
           FA   A,FR2                ADD A TO FORM PU
           FM   FR0,FR2              FR2 HOLDS W*PU
***        COMPUTE Q(U)=B+CU+DU**2, LEAVE IN FR3                        ***
           FMV  FR1,FR3              FR3=U
           FM   D,FR3                FR3=DU
           FA   C,FR3                FR3=C+DU
           FM   FR1,FR3              FR3=CU+DU**2
           FA   B,FR3                FR3=B+CU+DU**2=QU(U)
```

Section I

```
***        NOW NEED Q MODULO 4                                          ***
           MVW  Q,R5                 PICK UP Q
           MVW  R5,R6                COPY INTO R6 ALSO
           SRL  2,R5                 DIVIDE BY 4 (SHIFT RIGHT 2)
           SLL  2,R5                 MULTIPLY BY 4 (SHIFT LEFT 2)
           SW   R5,R6                SUBTRACT FROM ORIGINAL
           MVW  R6,Q0                STORE (Q MOD 4)

SLL  1,R6                 DOUBLE Q
*** DIFFERENT ROUTINES FOR Q0=0,1,2,3. SELECT BY A BRANCH TABLE         ***
*** 0:TANX  1:COTX  2:-COTX  3:-TANX
           MVA  TABLE,R3
           AW   R6,R3
           B    (R3)*
RTE0       FD   FR3,FR2              TAN=WP/Q
           FM   SIGN,FR2
           FMV  FR2,RES
           J    CONT2
RTE1       FD   FR2,FR3              COT=Q/WP
           FM   SIGN,FR3
           FMV  FR3,RES
           J    CONT2
RTE2       FD   FR2,FR3              COT=Q/WP
           FM   FPMIN,FR3            MULTIPLY BY -1
           FM   SIGN,FR3
           FMV  FR3,RES
RTE3       FD   FR3,FR2              TAN=WP/Q
           FM   FPMIN,FR2
           FM   SIGN,FR2
           FMV  FR2,RES
CONT2      EQU  *                    OK, EXCEPT FOR POSSIBLE SIGN
           MVW  RETADD,R3            ADDRESS TO RETURN RESULT
           MVD  RES,(R3)
           BAL  RETURN,R1
           RETURN
*************************************************************
```

Section J

```
X       DC   1F'0.0'               ABSOLUTE VALUE OF ANGLE
PI4     DC   1F'0.7853981634'      PI/4
Q       DC   1F'0'                 INTEGER PART OF ANGLE/PI4
R       DC   1F'0.0'               FRACTIONAL PART OF ABOVE
Q0      DC   1F'0'                 Q MODULO 4
W       DC   1F'0.0'               REDUCED ARGUEMENT
U       DC   1F'0.0'               0.5W**2
FP1     DC   1F'1.0'
FPHF    DC   1F'0.5'
FPMIN   DC   1F'-1.0'
A       DC   1F'-8.460901'
B       DC   1F'-10.772754'
C       DC   1F'5.703355'
D       DC   1F'-0.159321'
PU      DC   1F'0.0'               A+U
QU      DC   1F'0.0'               B+CU+DU**2
RES     DC   1F'0'                 TANGENT OF ANGLE
SIGN    DC   1F'1.0'               SIGN OF ANGLE (1 OR -1)
TABLE   DC   A(RTE0)
        DC   A(RTE1)
        DC   A(RTE2)
        DC   A(RTE3)
        ENDPROG
        END
```

Section K

```
****************************************************
***   SINGLE-FINGER OPERATION OF TABLET + DISPLAY  ***
****************************************************
TAPIT    PROGRAM   START,20,DS=(TOUCHDAT,SHAPES)
         EXTRN     FIFOPUSH,FIFOPOP,DRAWLINE,MAKELINE,CONNECT
         EXTRN     FINGER1,PLOTTER,GRID1,READAY,SKETCH,PUTSHAPE
         ENTRY     X,Y,X1,X2,Y1,Y2,VX,VY,OLDVX,OLDVY
         ENTRY     XOFFSET,YOFFSET,VSCALE,VIDEO
         ENTRY     NDOTS,ADDCAL,ADDCODE,ADDX
         ENTRY     KEY,XFIFO,YFIFO,PENDING,TWIST,DS2,ROTATE
         ENTRY     RETCODE,RCODE,KEY,KEYNUM,TIMEDEL,NDEL
         ENTRY     WRTTHRU,WRTTHRU1,BEAMON,BEAMOFF,DODATA
         ENTRY     HITUNE,LOTUNE,VOLT4,VOLT6,DELAY1,PICKED
         ENTRY     DRAWING,CANCEL,ENTER,POLY,WRTCNTRL,STOPPER
         ENTRY     HOLDER,LENGTH,NUMBER,LIMIT,POINT
         ENTRY     SSENSRIO,VXBUFF,VYBUFF,DSKPNT
*        IODEF     AD1,ADDRESS=63,POINT=0
*        IODEF     AD2,ADDRESS=63,POINT=1
         IODEF     DO1,TYPE=GROUP,ADDRESS=65
*        IODEF     A16,ADDRESS=62,POINT=0
*        IODEF     A14,ADDRESS=62,POINT=4
 ATTNLIST ($PF1,RUN,$PF5,QUIT)
 RUN     IF (HOLDER.EQ.1),THEN
            MOVE   HOLDER,0
            POST   RUNEVNT
         ELSE
            MOVE   HOLDER,1
         ENDIF
         ENDATTN
 QUIT    IF (LOOPING.EQ.0),THEN
            GOTO   QUITIT
         ELSE
            MOVE   STOPPER,1
         ENDIF
         ENDATTN
 START   EQU *
         CALL      CLEARIT
         CALL      MSG
         READ      DS1,DISKBUFF,1,1,END=DERR,ERROR=DERR,WAIT=YES
         MOVE      RR1,DISKBUFF,(36,BYTE)
         GOTO      START1
 DERR    ENQT      VIDEO
         PRINTEXT  'DISK ERROR OCCURRED',LINE=0,SPACES=0
         DEQT
         GOTO      QUITIT
 START1  CALL      BLANKER
         WAIT      RUNEVNT,RESET
         MOVE      LOOPING,1
         ENQT      VIDEO
         PRINTEXT  'RUNNING',LINE=22,SPACES=73
         DEQT
```

Section L

```
         AGAIN    EQU *
                  IF (STOPPER.EQ.1),GOTO,QUITIT
                  IF (HOLDER.EQ.1),THEN
                     MOVE   LOOPING,0
                     ENQT   VIDEO
                     PRINTEXT 'HOLDING',LINE=22,SPACES=73
                     DEQT
                     GOTO   START1
                  ENDIF
                  CALL   FINGER1
                  CALL   BLANKER
                  IF (RCODE.EQ.0),THEN
                     IF (NUMBER.LT.LENGTH),THEN
                        CALL   PLOTTER,1
                        CALL   FIFOPUSH,(X),(Y),(XFIFO),(YFIFO)
                     ENDIF
                  ELSE
                     GOTO   TESTKEY
                  ENDIF
                  IF (PENDING.EQ.0),THEN
                     GOTO   AGAIN
                  ELSE
                     MOVE   KEY,PENDING
                  ENDIF
```

```
TESTKEY   ENQT   VIDEO
          PRINTEXT  'SOFTKEY NUMBER ',LINE=3,SPACES=0
          PRINTNUM  KEY,LINE=3,SPACES=15
          DEQT
          IF  (KEY.EQ.LINE1),THEN
            CALL  MAKELINE
          ENDIF
          IF  (KEY.EQ.LINE2),THEN
            CALL  CONNECT
          ENDIF
          IF  (KEY.EQ.CANCEL),THEN
            MOVE  PENDING,0
            MOVE  ROTATE,1
          ENDIF
          IF  (KEY.EQ.GRD),THEN
            CALL  GRID1
          ENDIF
          IF  (KEY.EQ.DRA0),THEN
            MOVE  DRAWING,0
            CALL  SKETCH
          ENDIF
          IF  (KEY.EQ.DRA1),THEN
            MOVE  DRAWING,1
            CALL  SKETCH
```

Section M

```
          ENDIF
          IF  (KEY.EQ.CLR),THEN
            MOVE  NUMBER,0,(3,WORD)
          ENDIF
          IF  (KEY.GT.0).OR.(KEY.EQ.TWIST),THEN
            MOVE  DSKPNT,KEY
            CALL  PUTSHAPE
          ENDIF
          GOTO  AGAIN
QUITIT    CALL  CLEARIT
          PROGSTOP

**************************************************************
          SUBROUT  BLANKER
          ENTRY  BLANKER
          MOVE  DODATA,BEAMOFF
          SBIO  UO1,BEAMOFF
          RETURN
**************************************************************
          SUBROUT  MSG
          ENQT  VIDEO
          PRINTEXT  PFMSG,LINE=23,SPACES=0
          PRINTEXT  'HOLDING',LINE=22,SPACES=73
          DEQT
          RETURN
**************************************************************
          SUBROUT  CLEARIT
          ENQT  VIDEO
          ERASE  1920,TYPE=ALL,MODE=SCREEN
          DEQT
          RETURN
**************************************************************
          SUBROUT  BEEP,TUNE
          ENTRY  BEEP
          USER  *+2
          OW  TONE,DODATA       TURN ON BIT 02 OR BIT 03 (02=HITONE)
          IO  DOOUT
          RBTW  TONE,DODATA     TURN OFF BIT 02 OR 03 (03=LOTONE)
          IO  DOOUT
          BAL  RETURN,R1
          RETURN
**************************************************************
VIDEO     IOCB  $SYSLOG,SCREEN=STATIC,TOPM=0,BOTM=23
PFMSG     TEXT  'PF1:RUN/HOLD  PF5:END'
ADDCAL    DC  A(RR1)
ADDX      DC  A(X)
ADDCODE   DC  A(RETCODE)
```

Section N

```
**KEEP NEXT 10 TOGETHER
RETCODE   DC  1F'0'
T1        DC  1F'0'
T2        DC  1F'0'
X         DC  1E'0.0'
Y         DC  1E'0.0'
KEY       DC  1F'-1'
KEYNUM    DC  1F'0'
RCODE     DC  1F'0'
VX        DC  1F'0'
VY        DC  1F'0'
** KEEP NEXT 3 TOGETHER*********
```

```
RR1         DC    2L'0.0'
RR2         DC    2L'0.0'
S           DC    1E'29.5'
**KEEP NEXT 7 TOGETHER
X1          DC    1E'0.0'
X2          DC    1E'0.0'
Y1          DC    1E'0.0'
Y2          DC    1E'0.0'

XOFFSET     DC    1E'2.0'
YOFFSET     DC    1E'1.0'
VSCALE      DC    1E'2909.1'
*********************************
DISKBUFF    BUFFER  256,BYTES
VXBUFF      BUFFER  256,BYTES
VYBUFF      BUFFER  256,BYTES
**************************************************************
OLDVX       DC    1F'0'
OLDVY       DC    1F'0'
VXX         DC    1F'0'
VYY         DC    1F'0'
STOPPER     DC    1F'0'
GRIDDER     DC    1F'0'
FRAMER      DC    1F'0'
LOOPING     DC    1F'0'
HOLDER      DC    1F'1'
X0          DC    1E'-0.1'
Y0          DC    1E'-0.1'
INC         DC    1E'0.1'
*XLAST      DC    1E'0.0'
*YLAST      DC    1E'0.0'
NDOTS       DC    1F'100'
POLY        DC    1F'0'
FP1         DC    1E'1.0'
XINC        DC    1E'0.0'
YINC        DC    1E'0.0'
BEAMON      DC    X'8000'
BEAMOFF     DC    X'0000'
```

Section O

```
WRTTHRU     DC    X'4000'
WRTTHRU1    DC    X'C000'
DODOT       DC    X'4865'
DODATA      DC    X'0000'
TIMEDEL     DC    1F'0'
NDEL        DC    1F'5'
VOLT4       DC    1F'0'
VOLT5       DC    1F'0'
VOLT6       DC    1F'0'
VOLT7       DC    1F'0'
WRTCNTRL    DC    1F'1'      1 MEANS NORMAL WRITE
DELAY       DC    1F'1000'
DELAY1      DC    1F'400'
*LNGTH      DC    1E'0.0'
*IFLAG      DC    1F'0'
*DL         DC    1E'0.02'
PICKED      DC    1F'0'
PEN         DC    1F'0'
DOWN        DC    1F'1'
UP          DC    1F'0'
LOTONE      DC    X'1000'
HITONE      DC    X'2000'
XI          DC    1F'0'
YI          DC    1F'0'
NSHP        DC    1F'0'
XSHP        DC    1F'0'
YSHP        DC    1F'0'
ROTATE      DC    1F'1'
DRAWCTRL    DC    1F'0'      1 MEANS REQUIRE PUSHBUTTON TO DRAW
DRAWING     DC    1F'0'      1 MEANS IN DRAWING MODE
DSKPNT      DC    1F'1'
CANCEL      DC    1F'-2'     CANCEL PREVIOUS FUNCTION
ENTER       DC    1F'-3'
TWIST       DC    1F'-4'     ROTATE +90
LINE1       DC    1F'-5'     LINES
LINE2       DC    1F'-6'     CONNECT ALL DOTS IN STACK
GRD         DC    1F'-7'     GRID
CLR         DC    1F'-8'     CLEAR STACK
DRAW        DC    1F'-9'     DOODLE
DRAW1       DC    1F'-10'    DRAW
ORGNX       DC    1F'0'
ORGNY       DC    1F'0'
SCALEX      DC    1F'1'
SCALEY      DC    1F'1'
XSHIFT      DC    1F'0'
YSHIFT      DC    1F'0'
SCALR       DC    1F'2700'
FLIPPER     DC    1F'0'
DUMP        DC    1F'1'
```

Section P

```
                          0
     XFIFO      DC   16E'0.0'
     YFIFO      DC   16E'0.0'
     LENGTH     DC   1F'64'
     LIMIT      DC   1F'60'
     NUMBER     DC   1F'0'
     POINT      DC   1F'0'
     PENDING    DC   1F'0'
                ENDPROG
                END
```

Section Q

```
     CONNECT    PROGRAM    MAIN=NO
                SUBROUT    CONNECT
                ENTRY      CONNECT
                EXTRN      FIFOPUP,DRAWLINE
                EXTRN      NUMBER,X1,X2,Y1,Y2,PENDING,XFIFO,YFIFO
                IF    (NUMBER.GE.8).THEN
                   CALL    FIFOPUP,(X1),(Y1),(XFIFO),(YFIFO)
                   DO UNTIL.(NUMBER.EQ.0)
                      CALL    FIFOPUP,(X2),(Y2),(XFIFO),(YFIFO)
                      CALL    DRAWLINE
                      MOVE    X1,X2,(1,FLOAT)
                      MOVE    Y1,Y2,(1,FLOAT)
                   ENDDO
                ENDIF
                MOVE    PENDING,0
                RETURN
                ENDPROG
                END
```

Section R

```
     MAKELINE   PROGRAM    MAIN=NO
                SUBROUT    MAKELINE
                ENTRY      MAKELINE
                EXTRN      FIFOPUP,DRAWLINE,DELAY1
                EXTRN      PENDING,NUMBER,KEY,X1,X2,Y1,Y2,XFIFO,YFIFO
                IF    (NUMBER.LT.8).THEN
                   MOVE    PENDING,KEY
                ELSE
                   CALL    FIFOPUP,(X1),(Y1),(XFIFO),(YFIFO)
                   CALL    FIFOPUP,(X2),(Y2),(XFIFO),(YFIFO)
                   CALL    DRAWLINE
                   STIMER  DELAY1,WAIT
                ENDIF
                RETURN
                ENDPROG
                END
```

Section S

```
** DRAW A LINE FROM (X1,Y1) TO (X2,Y2)
     DRAWLINE   PROGRAM    MAIN=NO
                SUBROUT    DRAWLINE
                ENTRY      DRAWLINE
                ENTRY      DL
                EXTRN      ROOT,PLOTTER
                EXTRN      X,Y,X1,X2,Y1,Y2
                USER  *+2              FIRST COMPUTE LINE LENGTH
                FMV   X1,FR0
                FS    X2,FR0
                FM    FR0,FR0          DX**2
                FMV   Y1,FR1
                FS    Y2,FR1
                FM    FR1,FR1          DY**2
                FA    FR0,FR1
                FMV   FR1,LNGTH
                BAL   RETURN,R1
                CALL  ROOT,(LNGTH),(IFLAG)
                USER  *+2
                FMV   LNGTH,FR0        NOW COMPUTE NUMBER OF SEGMENTS
                FD    DL,FR0           AND INCREMENTS
                FMVC  FR0,NDOTS        NUMBER OF DOTS IN LINE
                FS    FP1,FR0          FR0=NDOTS-1=NSEGMENTS
                FMV   X2,FR1           FR1=X2
                FS    X1,FR1           FR1=X2-X1
                FD    FR0,FR1          FR1=(X2-X1)/NSEGMENTS
                FMV   FR1,XINC         STORE X INCREMENT
                FMV   X1,FR2           FR2=X1
                FMV   FR2,X            STARTING X COORDINATE
                FMV   Y2,FR1           FR1=Y2
                FS    Y1,FR1           FR1=Y2-Y1
```

```
          FD    FR0,FR1              FR1=(Y2-Y1)/NSEGMENTS
          FMV   FR1,YINC             STORE Y INCREMENT
          FMV   Y1,FR2               FR2=Y1
          FMV   FR2,Y                STARTING Y COORDINATE
          BAL   RETURN,R1
          DJ    NDOTS,TIMES
          CALL  PLOTTER.1
          USER  *+2
          FMV   X,FR0                FR0=X
          FA    XINC,FR0             FR0=X+XINC
          FMV   FR0,X                STORE INCREMENTED X VALUE
          FMV   Y,FR1                FR1=Y
          FA    YINC,FR1             FR1=Y+YINC
          FMV   FR1,Y                STORE INCREMENTED Y VALUE
          BAL   RETURN,R1
          ENDDO
          RETURN
 XINC     DC    1E'0.0'
 YINC     DC    1E'0.0'
 FP1      DC    1E'1.0'
 LNGTH    DC    1E'0.0'
 IFLAG    DC    1F'0'
 DL       DC    1E'0.02'
 NDOTS    DC    1F'0'

ENDPROG
          END
```

Section T

```
***   PUSH A FLOATING NUMBER ONTO A CIRCULAR FIFO STACK
FIFOPOP   PROGRAM MAIN=NO
          SUBROUT FIFOPOP,ADDX,ADDY,ADDXSTAK,ADDYSTAK
          ENTRY FIFOPOP
          EXTRN POINT,NUMBER,LENGTH,LIMIT
START     USER  *+2
          MVW   NUMBER,R1            TEST FOR EMPTY STACK
          JZ    POPEXIT              QUIT IF EMPTY
          MVW   ADDXSTAK,R1          XSTACK ADDRESS
          AW    POINT,R1             POINTER TO DATA WORD
          MVD   (R1),ADDX*
          MVW   ADDYSTAK,R3
          AW    POINT,R3
          MVD   (R3),ADDY*
          SWI   4,NUMBER             REDUCE NUMBER BY 1
          AWI   4,POINT              RESET POINTER
          CW    LIMIT,POINT          CHECK FOR WRAP
          JNP   POPEXIT
          MVWI  0,POINT
POPEXIT   BAL   RETURN,R1
          RETURN
************************************
          ENDPROG
          END
```

Section U

```
***   PUSH A FLOATING NUMBER PAIR ONTO CIRCULAR FIFO STACKS
***   CALL FIFOPUSH,(X),(Y),(XSTACK),(YSTACK)
FIFOPUSH  PROGRAM MAIN=NO
          SUBROUT FIFOPUSH,ADDX,ADDY,ADDXSTAK,ADDYSTAK
          ENTRY FIFOPUSH
          EXTRN POINT,NUMBER,LENGTH,LIMIT
START     USER  *+2
          CW    LENGTH,NUMBER        CHECK FOR FULL STACK
          JNN   PUSHEXIT             DON'T PUSH IF STACK FULL
          MVW   POINT,R1             LOCATION OF FIRST WORD (IN BYTES)
          AW    NUMBER,R1            NUMBER OF BYTES IN STACK
          CW    LIMIT,R1             CHECK FOR WRAPAROUND
          JNP   NOWRAP
          SW    LENGTH,R1
NOWRAP    MVW   R1,R3
          AW    ADDXSTAK,R1          POINT TO STACK ADDRESS
          MVD   ADDX*,(R1)
          AW    ADDYSTAK,R3
          MVD   ADDY*,(R3)
          AWI   4,NUMBER             BUMP NUMBER
PUSHEXIT  BAL   RETURN,R1
          RETURN
************************************
          ENDPROG
          END
```

Section V

```
SKETCH     PROGRAM   MAIN=NO
           SUBROUT   SKETCH
           ENTRY     SKETCH
           EXTRN     READAY,PLOTTER,$SENSRIO
           EXTRN     HOLDER,STOPPER,RCODE,DRAWING,KEY,CANCEL
           IODEF     A16,ADDRESS=02,POINT=0
START      CALL      READAY
           IF  (HOLDER.EQ.1).OR.(STOPPER.EQ.1),THEN
              RETURN
           ENDIF
           IF  (RCODE.EQ.0),THEN
              IF (DRAWING.EQ.0),THEN
                 CALL   PLOTTER.1
                 GOTO   START
              ELSE
                 SBIO   A16,VOLT6
                 IF  (VOLT6.GT.10000),THEN
                    CALL   PLOTTER.1
                    GOTO   START
                 ELSE
                    CALL   PLOTTER.0
                    GOTO   START
                 ENDIF
              ENDIF
           ENDIF
           IF  (KEY.EQ.CANCEL),THEN
              RETURN
           ELSE
              GOTO  START
           ENDIF
***********************
VOLT6      DC    1F'0'
           ENDPROG
           END
```

Section W

```
***********************************************************
*** PLOT AN X,Y POINT ON A TEKTRONIX 611 SCOPE. X,Y FLOATING PT
*** IF MODE IS 0, PLOTS IN WRITE-THROUGH MODE.
***********************************************************
PLOTTER    PROGRAM   MAIN=NO
           SUBROUT   PLOTTER,MODE
           ENTRY     PLOTTER
           EXTRN     $SENSRIO,BEAMON,BEAMOFF,DODATA
           EXTRN     X,Y,VX,VY,VSCALE,TIMEDEL,WRTTHRU,WRTTHRU1
           IODEF     AO1,ADDRESS=03,POINT=0
           IODEF     AO2,ADDRESS=03,POINT=1
           IODEF     DO1,TYPE=GROUP,ADDRESS=05
START      EQU   *
           USER  *+2           SCALE X AND Y TO DRIVE A/D CONVERTORS
           FMV   X,FRO
           FM    VSCALE,FRO    SCALING FOR TEKTRONIX 611 SCOPE
           FMVC  FRO,VX
           FMV   Y,FRO
           FM    VSCALE,FRO
           FMVC  FRO,VY
           BAL   RETURN,R1
           SBIO  AO1,VX
           SBIO  AO2,VY
           IF  (MODE.EQ.0),GOTO,NOWRT
           SBIO  DO1,BEAMON
           MOVE  TIMEDEL,0
           MOVE  DODATA,BEAMOFF
           SBIO  DO1,BEAMOFF
           GOTO  ENDPLT
NOWRT      EQU   *
           SBIO  DO1,WRTTHRU
           SBIO  DO1,WRTTHRU1
           MOVE  DODATA,WRTTHRU1
ENDPLT     RETURN
***********************************************************
           ENDPROG
           END
```

Section X

```
***  PROGRAM TO COMPUTE SQUARE ROOTS, USING METHOD DESCRIBED IN    ***
***  PUBLICATION  360S-LM-501 (IBM SYSTEM/360 FORTRAN IV LIBRARY)  ***
***  JAMES L. LEVINE 11/10/79. TO USE CALL ROOT,(X),(IFLAG)        ***
***  VARIABLES IN MAIN:  X DC E'0.0', IFLAG DC F'0'                ***
***  NOTE: ROOT APPEARS IN VARIABLE IN WHICH ARGUEMENT WAS STORED  ***
***  IF INPUT IS NEGATIVE, SETS IFLAG=-1 IN MAIN AND COMPUTES ROOT ***
***  OF ABSOLUTE VALUE. OTHERWISE, IFLAG SET TO 0. CODE IS REUSABLE***
ROOT     PROGRAM  START,PARM=1,MAIN=NO
         SUBROUT  ROOT,ADDX,ADD1
         ENTRY    ROOT
START    USER **2
***  WANT TO LIMIT MANTISSA TO RANGE 1/16--1                       ***
***  FIRST DEAL WITH EXPONENT. WANT TO DIVIDE IT IN HALF, AND      ***
***  NOTE IF WAS ODD. IF SO, FINAL RESULT MUST BE MULTIPLIED BY 4  ***
         MVW   ADD1,R1         POINT TO IFLAG IN CALLER
         MVWI  0,(R1)          INITIALIZE TO 0
         MVW   ADDX,R0         R0 POINTS TO DATA IN CALLING PGM
         IBTR  (R0,0)          CLEAR BIT 1 IF ON (ABSOLUTE VALUE OF X)
         JZ    CONT            JUMP IF X WAS POSITIVE
         MVWI  -1,(R1)         SET IMAGINARY FLAG IF X NEGATIVE
CONT     MVB   (R0),TEMP+1     PICK UP EXPONENT
         MVD   TEMP,R3         STORE IN REGISTER PAIR R3-R4
         SWI   64,R3           REMOVE OFFSET
         SRLD  1,R3            DIVIDE BY TWO, LOW ORDER BIT TO R4
         AWI   64,R3           REPLACE OFFSET
***  R3 CONTAINS NEW EXPONENT. R4 IS NON-ZERO IF ORIGINAL WAS ODD  ***
***  DON'T TAMPER WITH R3,R4                                       ***
**** NOW MUST GET SQUARE ROOT OF MANTISSA
         MVB   B40,(R0)        MAKES NUMBER LOOK AS IF IN RANGE 1/16--1
***  COMPUTE INITIAL APPROXIMATION  Y1 = A + B/(C + X)             ***
         FMV   (R0),FR0        FR0 = X
         FMV   FO,FR3
         FC    FR0,FR3         COMPARE WITH 0
         JZ    DONE            QUIT NOW IF 0
         FA    C,FR0           FR0 = C + X
         FMV   B,FR1           FR1 = B
         FD    FR0,FR1         FR1 = B/(C + X)
         FA    A,FR1           FR1 = YN
```

Section Y

```
***  NOW REFINE BY TWO PASSES OF NEWTON-RAPHSON ITERATION          ***
         MVWI  2,R7
LOOP     FMV   (R0),FR0        FR0 = X
         FD    FR1,FR0         FR0 = X/YN
         FA    FR0,FR1         FR1 CONTAINS YN + X/YN
         FM    FHALF,FR1       FR1 = YN+1
         JCT   LOOP,R7
         FMV   FR1,(R0)        PLACE RESULT BACK IN X
         MVB   R3,(R0)         INSERT NEW EXPONENT
         CWI   0,R4            SEE IF ORIGINAL EXPONENT WAS ODD
         JZ    DONE            FINISHED IF EVEN
         FMV   (R0),FR0        ELSE MUST
         FM    F4,FR0          MULTIPLY BY 4
         FMV   FR0,(R0)        AND STORE IT
DONE     EQU   *
         BAL   RETURN,R1
         RETURN

TEMP     DC    2F'0'
F0       DC    E'0.0'
F4       DC    E'4.0'
FHALF    DC    E'0.5'
A        DC    E'1.681595'
B        DC    E'-1.288973'
C        DC    E'0.6408065'
B40      DC    X'4040'
         ENDPROG
         END
```

Section Z

```
*********************************************************************
PUTSHAPE   PROGRAM   MAIN=NO
           SUBROUT   PUTSHAPE
           ENTRY PUTSHAPE
           EXTRN    FIFOPOP,NUMBER,SSENSRIO,VIDEO
           EXTRN    ROTATE,DS2,VXBUFF,VYBUFF,DSKPNT,VSCALE
           EXTRN    PENDING,KEY,CANCEL,XFIFO,YFIFO,TWIST
           EXTRN    NDEL,TIMEDEL,BEAMON,BEAMOFF,WRTTHRU,DODATA
           IODEF    AU1,ADDRESS=63,POINT=0
           IODEF    AU2,ADDRESS=63,POINT=1
           IODEF    UU1,TYPE=GROUP,ADDRESS=65
           IF   (KEY,EQ,TWIST),THEN
             ADD    ROTATE,1
             IF   (ROTATE,GT,4),THEN
               MOVE   ROTATE,1
             ENDIF
             STIMER   DELAY2,WAIT
             RETURN
           ENDIF
           IF   (NUMBER,EQ,0),THEN
             MOVE   PENDING,KEY
             RETURN
           ENDIF
           READ   DS2,VXBUFF,1,DSKPNT,END=DERR,ERROR=DERR
           ADD    DSKPNT,1
           READ   DS2,VYBUFF,1,DSKPNT,END=DERR,ERROR=DERR
           SUB    DSKPNT,1
           CALL   FIFOPOP,(X),(Y),(XFIFO),(YFIFO)
           FMULT  X,VSCALE
           FPCONV XSHP,X,PREC=SF
           FMULT  Y,VSCALE
           FPCONV YSHP,Y,PREC=SF
           MOVE   NSHP,VXBUFF          FIRST WORD OF BUFFER IS NUMBER OF PTS
           MOVE   #1,2
           DO   NSHP,TIMES
             GOTO   (NOPLT,ROT0,ROT90,ROT180,ROT270),ROTATE
ROT0         ADD    (VXBUFF,#1),XSHP,RESULT=VXX
             ADD    (VYBUFF,#1),YSHP,RESULT=VYY
             GOTO   PLTIT
ROT90        SUB    XSHP,(VYBUFF,#1),RESULT=VXX
             ADD    (VXBUFF,#1),YSHP,RESULT=VYY
             GOTO   PLTIT
ROT180       SUB    XSHP,(VXBUFF,#1),RESULT=VXX
             SUB    YSHP,(VYBUFF,#1),RESULT=VYY
             GOTO   PLTIT
ROT270       ADD    XSHP,(VYBUFF,#1),RESULT=VXX
             SUB    YSHP,(VXBUFF,#1),RESULT=VYY
```

Section AA

```
PLTIT        SBIO   AU1,VXX
             SBIO   AU2,VYY
             DO   NDEL,TIMES
               ADD    TIMEDEL,0
             ENDDO
             SBIO   UU1,BEAMON
             ADD    #1,2
             SBIO   UU1,BEAMOFF

MOVE   DODATA,BEAMOFF
           ENDDO
           SBIO   UU1,WRTTHRU
           SBIO   UU1,BEAMOFF
           MOVE   DODATA,BEAMOFF
           MOVE   ROTATE,1
           MOVE   PENDING,0
NOPLT      RETURN
DERR       ENUT   VIDEO
           PRINTEXT  "DISK ERROR OCCURRED",LINE=0,SPACES=0
           DLUT
           RETURN
*********************************************************************
X          DC    1E"0.0"
Y          DC    1E"0.0"
NSHP       DC    1F"0"
XSHP       DC    1F"0"
YSHP       DC    1F"0"
VXX        DC    1F"0"
VYY        DC    1F"0"
DELAY2     DC    1F"400"
           ENDPROG
           END
```

Section AB

```
***     WRITES A GRID ON THE SCREEN. CALL GRID
GRID1       PROGRAM START,MAIN=NO
            SUBROUT GRID1
            ENTRY  GRID1
            EXTRN  DRAWLINE,X1,X2,Y1,Y2,DL
START       MOVE   OLDDL,DL,(1,FLOAT)
            MOVE   DL,DLTEMP,(1,FLOAT)
            MOVE   X1,0,(1,FLOAT)
            MOVE   X2,11,(1,FLOAT)
            MOVE   Y1,0,(2,FLOAT)
            DO     12,TIMES
            CALL   DRAWLINE
            FADD   Y1,1
            FADD   Y2,1
            ENDDO
            MOVE   X1,0,(2,FLOAT)
            MOVE   Y1,0,(1,FLOAT)
            MOVE   Y2,11,(1,FLOAT)
            DO     12,TIMES
            CALL   DRAWLINE
            FADD   X1,1
            FADD   X2,1
            ENDDO
            MOVE   DL,OLDDL,(1,FLOAT)
            RETURN
OLDDL       DC     1E'0.02'
DLTEMP      DC     1E'0.11'
            ENDPROG
            END
```

Section AC

```
*** THIS PROGRAM RUNS UNDER EDX ON AN IBM SERIES/1 COMPUTER.      **
*** THE LANGUAGE IS A MIXTURE OF EDS (HIGH-LEVEL) AND ASSEMBLER.  **
*** THE EXTERNAL SUBROUTINE 'READXY' OPERATES THE TABLET AND      **
*** RETURNS X AND Y COORDINATE VALUES AND A RETURN CODE (RCODE).  **
*** THE CODE VALUES ARE -1 FOR FINGER-UP, 0 FOR FINGER DOWN AND   **
*** +1 FOR A SOFT-KEY. THIS IS USED TO ESCAPE FROM INPUT.         **
*** WHEN THIS SUBROUTINE ENDS, RCODE IS REDEFINED AS FOLLOWS:     **
*** +1 MEANS SOFTKEY STORED IN VARIABLE 'KEY', 0 MEANS SUCCESS.   **
*** NOTES: NB (BOUNCE COUNTER) IS BUMPED TWICE DURING A BOUNCE    **
*** X,Y COORDINATES IN INCHES. THE EXTERNAL SUBROUTINE 'BEEP'     **
*** GENERATES AUDIO TONES WHEN CALLED. THE SUBROUTINE 'PLOTTER'   **
*** PLOTS POINTS ON THE DISPLAY, WHILE 'ROOT' TAKES SQUARE ROOTS. **
*****************************************************************
FINGER1     PROGRAM MAIN=NO
            SUBROUT FINGER1
            ENTRY  FINGER1
            EXTRN  READXY,PLOTTER,BEEP,ROOT
            EXTRN  X,Y,RCODE,STOPPER,HOLDER,HITONE,LOTONE
*****************************************************************
*** PHASE 1 DETECTS INITIAL FINGER-DOWN STEP, THEN EXITS TO       **
*** PHASE2. THIS REQUIRES N1 SEQUENTIAL FINGER-DOWN INDICATIONS   **
*****************************************************************
START       MOVE   NB,0,(2,WORD)
            MOVE   MODE,1
READ1       DO UNTIL,(MODE,EQ,4)
            CALL   READXY
            IF     (RCODE,EQ,1),OR,(STOPPER,EQ,1),OR,(HOLDER,EQ,1),THEN
              RETURN
            ENDIF
            IF     (RCODE,EQ,0),THEN
              MOVE PEN,DOWN
            ELSE
              MOVE PEN,UP
            ENDIF
            IF     (MODE,EQ,1),THEN
              CALL MODE1
            ELSE
              IF   (MODE,EQ,2),THEN
                CALL MODE2
              ELSE
                CALL MODE3
              ENDIF
            ENDIF
            ENDDO
GOTIT       EQU *
            CALL   RMSTEST
            IF     (RMS,LT,TOL,FLOAT),THEN
              CALL BEEP,HITONE
              MOVE RCODE,0
              RETURN
```

Section AD

```
          ELSE
              CALL   BEEP,LOTONE
              MOVE   MODE,1

GOTO   START
          ENDIF
*************************************************************************
*** MODE 1: STACK DATA TILL STEADY PEN-DOWN SIGNAL, THEN SET MODE2 *
*************************************************************************
          SUBROUT  MODE1
          IF   (PEN,EQ,UP),THEN
              MOVE   NO,0
              RETURN
          ENDIF
          ADD   NO,1
          IF   (NO,GT,1),THEN
              CALL   PUSH
          ENDIF
          IF   (NO,GT,N1),THEN
              MOVE   NO,0
              MOVE   MODE,2
              CALL   BEEP,HITONE
          ENDIF
          RETURN
*************************************************************************
*** MODE2: STACK DATA TILL FIRST FINGER-UP SIGNAL, THEN SET MODE3 **
*************************************************************************
          SUBROUT  MODE2
          IF   (PEN,EQ,UP),THEN
              MOVE   NU,1
              MOVE   MODE,3
          ELSE
              CALL   PUSH
          ENDIF
          RETURN
*************************************************************************
*** LOOK FOR STEADY PEN-UP SIGNAL (NU=N3) SET MODE 1 IF PEN GOES    **
*** DOWN AGAIN (NO=N2).
*************************************************************************
          SUBROUT  MODE3
          IF   (PEN,EQ,UP),THEN
              ADD NU,1
              IF    (NU,GE,N3),THEN
                  MOVE   MODE,4
              ENDIF
          ELSE
              ADD   NO,1
              MOVE  NU,0
```

Section AE

```
          IF   (NO,GE,N2),THEN
              MOVE   NU,0,(2,WORD)
              MOVE   MODE,1
          ENDIF
          ENDIF
          RETURN
*************************************************************************
*** PUSH X,Y, ONTO STACKS, INCREMENT POINTERS                       **
*************************************************************************
          SUBROUT  PUSH

MOVE   #2,POINTER
          MOVE   (XSTACK,#2),X,(1,FLOAT)
          MOVE   (YSTACK,#2),Y,(1,FLOAT)
          ADD    POINTER,4
          IF    (POINTER,GE,STAKLNTH),THEN
              MOVE   POINTER,0
          ENDIF
          IF   (NO,GT,1),OR,(MODE,EQ,2),THEN
              CALL   AVERAGE
              CALL   PLOTTER,0
          ENDIF
          RETURN
```

```
*************************************************************
*** AVERAGE TWO POINTS FROM STACK FOR INSTANTANEOUS PLOTTING **
*** IN WRITE-THROUGH MODE. DOES NOT ALTER POINTERS           **
*************************************************************
         SUBROUT  AVERAGE
         USER     *+2
         FMV      FP0,FR0       CLEAR FR0 AND FR1 BEFORE AVERAGING
         FMV      FP0,FR1
         MVW      POINTER,R4    POINTER TO NEXT EMPTY STACK POSITION
         MVWI     2,R7          TWO POINTS TO AVERAGE
LOOP     SWI      4,R4          BACK UP ONE WORD
         JNN      CONT1         TEST FOR WRAP
         AW       STAKLNTH,R4   WRAP POINTER IF NECESSARY
CONT1    MVA      XSTACK,R1     R1 POINTS TO START OF XSTACK
         AW       R4,R1         NOW POINTS TO FIRST WORD TO AVERAGE
         FA       (R1),FR0      ADD X TO XAV (FR0)
         AW       STAKLNTH,R1   POINT TO YSTACK
         FA       (R1),FR1      ADD Y TO YAV (FR1)
         JCT      LOOP,R7
         FD       FP2,FR0       DIVIDE FR0 BY 2 TO GET XAV
         FMV      FR0,X         STORE IN X
         FD       FP2,FR1       DIVIDE FR1 BY 2 TO GET YAV
         FMV      FR1,Y         STORE IN Y
         BAL      RETURN,R1
         RETURN
```

Section AF

```
*************************************************************
*** PULLS X,Y,VX,VY FROM STACKS, DECREMENTS POINTERS         **
*************************************************************
         SUBROUT  PULL          PULL X-Y PAIR FROM CIRCULAR STACKS
         USER     *+2
         MVA      XSTACK,R1
         MVA      YSTACK,R3
         AW       POINTER,R1
         AW       POINTER,R3
         MVD      (R1),XTEMP    PICK UP A X AND STORE IN XTEMP
         MVD      (R3),YTEMP    PICK UP A Y AND STORE IN YTEMP
         SWI      4,POINTER     DECREMENT STACK POINTER
         JNN      CONT2         TEST FOR STACK WRAPAROUND
         AW       STAKLNTH,POINTER
CONT2    EQU      *
         BAL      RETURN,R1
         RETURN
*************************************************************
*** AVERAGE X,Y,VX,VY FROM PREVIOUS TIME DEFINED BY OFFSET   **
*** CALCULATE RMS NOISE FOR FINAL TEST                       **
*************************************************************
         SUBROUT  RMSTEST
         SUB      POINTER,OFFSET
         IF       (POINTER,LT,0),THEN
         ADD      POINTER,STAKLNTH
         ENDIF
         FPCONV   FPN,N
         MOVE     SX,0,(4,FLOAT)    CLEAR SX,SXX,SY,SYY
         DO       N,TIMES
         CALL     PULL              GET AN X,Y PAIR
         FADD     SX,XTEMP          SUM X
         FMULT    XTEMP,XTEMP       X**2
         FADD     SXX,XTEMP         SUM X**2
         FADD     SY,YTEMP          SUM Y
         FMULT    YTEMP,YTEMP       Y**2
         FADD     SYY,YTEMP         SUM Y**2
         ENDDO
         FDIVD    SX,FPN            AVERAGE  SX
         MOVE     X,SX,(1,FLOAT)    STORE FINAL X
         FDIVD    SY,FPN            AVERAGE  SY
         MOVE     Y,SY,(1,FLOAT)    STORE FINAL Y
** RMS**2 = ((SXX-NSXSX)/N) + ((SYY-NSYSY)/N)
         FMULT    SX,SX             SXSX
         FMULT    SX,FPN            NSXSX
         FSUB     SXX,SX
         FDIVD    SXX,FPN           SXX IS NOW XRMS**2
         FMULT    SY,SY             SYSY
         FMULT    SY,FPN            NSYSY
```

Section AG

```
            FSUB     SYY,SY
            FDIVD    SYY,FPN           SYY IS NOW YRMS**2
            MOVE     RMS,SYX,(1,FLOAT)
            FAUD     RMS,SYY           RMS ERROR (RMS**2 ACTUALLY)
            CALL     RTOUT,(RMS),(IFLAG)
            RETURN
*****************************************************************
** DATA SECTION                                                **
*****************************************************************
PEN        DC    1F'0'
UP         DC    1F'1'
DOWN       DC    1F'0'
NU         DC    1F'0'    FINGER-UP COUNTER
ND         DC    1F'0'    FINGER-DOWN COUNTER
MODE       DC    1F'1'
N1         DC    1F'5'    INITIAL DOWN COUNT
N2         DC    1F'5'    MAXIMUM DOWNS AFTER AN UP
N3         DC    1F'3'    FINAL UP COUNT
XSTACK     DC    32E'0.0'
YSTACK     DC    32E'0.0'
POINTER    DC    1F'0'
STAKLNTH   DC    1F'128'
OFFSET     DC    1F'6'    BYTES BACK ALONG STACK TO GET FINAL POINT
XTEMP      DC    1F'0.0'
YTEMP      DC    1F'0.0'

N          DC    1F'3'    NUMBER TO AVERAGE FROM STACK
FPN        DC    1F'3.0'
SX         DC    1F'0.0'
SXX        DC    1F'0.0'
SY         DC    1F'0.0'
SYY        DC    1F'0.0'
RMS        DC    1F'0.0'
IFLAG      DC    1F'0'
TCL        DC    1F'0.03'
FP0        DC    1F'0.0'
FP2        DC    1F'2.0'
*****************************************************************
            ENDPROG
            END
*****************************************************************
```

Having thus described our invention, what we claim as new and desire to secure by Letters Patent is:

1. Interface apparatus for translating the location of a manually established position on a surface area into data useful in a data processing operation comprising in combination:
   a manually positionable member,
   a surface area,
   means for providing scanning light motion in a plane essentially parallel with and adjacent to said area with at least one light beam along at least two linear essentially perpendicular directions,
   a light responsive detector member positioned at one end of the scanning light travel in each said direction,
   means for retroreflective light enhancement employing a material that reflects back toward the source a large fraction of incident light the amount being relatively insensitive to the angle of incidence coextensive with the length of each said direction so positioned that said area is between said scanning light and said retroreflective light enhancement means,
   light sensing means responsive to retroreflected light as said scanning light passes said manually positionable member, and
   means specifying the location of the position of said manually positionable member based on said change of reflected light in relation to the time said scanning light strikes said detector.

2. The apparatus of claim 1 wherein said means to sense a change in reflected light is positioned between each source of light and a moving reflective member providing said means for providing scanning light motion.

3. The apparatus of claim 2 including means for reflecting said scanning light into a plane other than said plane essentially parallel with and adjacent to said surface.

4. The apparatus of claim 3 wherein said other plane is a plane that is parallel to said surface area and located on the side of said surface away from the side on which manually positioned member is in said scanning light.

5. The apparatus of claim 4 wherein said surface area is transparent and is mounted adjacent and essentially parallel to the surface of a display.

6. The apparatus of claim 5 wherein said surface area is transparent and essentially rectangular and said scanning means includes a moving mirror positioned essentially at one corner thereof.

7. The apparatus of claim 6 wherein said surface is transparent and essentially rectangular and said scanning means involves moving mirrors at ends of a line parallel with one side of the rectangle.

8. The apparatus of claim 7 wherein said display is a cathode ray tube.

9. Apparatus for translating a manually established position on a surface into data representative of the location of said position comprising in combination:
   a manually positionable member,
   a surface having two essentially divergent directions defining an area thereof,
   means for scanning said area of said surface with a light beam reflected from a moving reflective member positioned at a first location,
   a light responsive detector member positioned at one end of the scanning travel in each said direction, retroreflective means employing a material that reflects back toward the source a large fraction of the incident light the amount being relatively insensitive to the angle of incidence operable to provide a localized illumination level positioned along divergent edges of said surface corresponding to said directions said position being opposite to said first location, sensing means positioned in the path between the source of said light beam and said moving reflective member operable to sense reflected light change caused by the presence of said manually positioned member by splitting a portion of the reflected light from said moving reflective member, and position coordinate signal generation means employing the difference in time when said scanning light strikes said detector member in a linear sweep along one said direction and the time said light change is produced by said manually positionable member.

10. The apparatus of claim 9 including means for manual position compensation by storing an immediately recent series of position locations and selecting a position location that is prior in time to the last stored position occupied by said manual member.

11. The apparatus of claim 10 wherein said prior time is 0.3 seconds.

12. In apparatus of the type where the location of an object is sensed by the effect of the presence of the object between a scanning light and a reflecting member the improvement comprising in combination means for correlating location points in progress of a scan along a direction by time elapsed from illumination, by said scanning light, of a light sensing detector member located at the start of said scan in a direction, means, including a member of retroreflective material that reflects back toward the source a large fraction of the incident light the amount being relatively insensitive to the angle of incidence positioned along the length of said scan and splitting off a portion of the reflected light, for sensing a change in reflected light level caused by the presence of said object, and means for specifying an element of location information for said object based on said elapsed time and said change in reflected light level.

13. The apparatus of claim 12 wherein said splitting off means is positioned between the source of said scanning light and a reflective member providing scanning motion to said light.

14. The apparatus of claim 13 including means for reflecting said scanning light into a plane other than the plane between said retroreflective member and said moving reflective member.

* * * * *